US008430739B2

(12) United States Patent
Rodgers

(10) Patent No.: US 8,430,739 B2
(45) Date of Patent: Apr. 30, 2013

(54) GAMING SYSTEM AND METHOD HAVING WAGER DEPENDENT DIFFERENT SYMBOL EVALUATIONS

(75) Inventor: Paulina Rodgers, Reno, NV (US)

(73) Assignee: IGT, Reno, NV (US)

( * ) Notice: Subject to any disclaimer, the term of this patent is extended or adjusted under 35 U.S.C. 154(b) by 1243 days.

(21) Appl. No.: 11/936,928

(22) Filed: Nov. 8, 2007

(65) Prior Publication Data

US 2008/0132320 A1 Jun. 5, 2008

Related U.S. Application Data

(60) Provisional application No. 60/865,291, filed on Nov. 10, 2006.

(51) Int. Cl.
*A63F 13/02* (2006.01)
*A63F 13/10* (2006.01)

(52) U.S. Cl.
USPC .................................. 463/20; 463/25; 463/31

(58) Field of Classification Search .................... 463/16, 463/20, 25, 26–29, 30, 31, 40–42, 11–13, 463/17–19, 43
See application file for complete search history.

(56) References Cited

U.S. PATENT DOCUMENTS

| | | | |
|---|---|---|---|
| 3,420,525 | A | 1/1969 | Waders |
| 3,642,287 | A | 2/1972 | Lally et al. |
| 3,667,757 | A | 6/1972 | Holmberg |
| 3,735,987 | A | 5/1973 | Ohki |
| 4,198,052 | A | 4/1980 | Gauselmann |
| 4,326,351 | A | 4/1982 | Heywood et al. |
| 4,410,178 | A | 10/1983 | Partridge |
| 4,448,419 | A | 5/1984 | Telnaes |
| 4,517,558 | A | 5/1985 | Davids |
| 4,618,150 | A | 10/1986 | Kimura |
| 4,624,459 | A | 11/1986 | Kaufman |
| 4,695,053 | A | 9/1987 | Vazquez, Jr. et al. |

(Continued)

FOREIGN PATENT DOCUMENTS

| | | | |
|---|---|---|---|
| AU | 199716432 | B2 | 9/1997 |
| AU | 199717601 | B2 | 9/1997 |

(Continued)

OTHER PUBLICATIONS

Aztec Temple Multiway Article, written by IGT, published in Strictly Slots Aug. 2005.

(Continued)

*Primary Examiner* — David L Lewis
*Assistant Examiner* — Matthew D. Hoel
(74) *Attorney, Agent, or Firm* — Neal, Gerber & Eisenberg LLP

(57) ABSTRACT

A gaming device provides one or more different types of symbol evaluations based on the amount wagered by a player in a game. In one embodiment, the gaming device includes a plurality of different types of symbol evaluation, each type of symbol evaluation associated with a different wager amount. If the player wagers a first wager amount to cause a play of the game, the gaming device provides a first type of symbol evaluation. If the player wagers a second wager amount to cause a play of the game, the gaming device provides a second, different type of symbol evaluation in addition to the first type of symbol evaluation.

45 Claims, 20 Drawing Sheets

U.S. PATENT DOCUMENTS

| | | | | |
|---|---|---|---|---|
| 4,732,386 | A | | 3/1988 | Rayfiel |
| 4,756,531 | A | | 7/1988 | DiRe et al. |
| 4,826,169 | A | | 5/1989 | Bessho et al. |
| 4,836,553 | A | | 6/1989 | Suttle et al. |
| 4,838,552 | A | | 6/1989 | Hagiwara |
| 4,861,041 | A | | 8/1989 | Jones et al. |
| 4,871,171 | A | | 10/1989 | Rivero |
| 4,874,173 | A | | 10/1989 | Kishishita |
| 4,978,129 | A | | 12/1990 | Komeda et al. |
| 4,991,848 | A | | 2/1991 | Greenwood et al. |
| 5,019,973 | A | | 5/1991 | Wilcox et al. |
| 5,078,405 | A | | 1/1992 | Jones et al. |
| 5,085,436 | A | | 2/1992 | Bennett |
| 5,098,107 | A | | 3/1992 | Boylan et al. |
| 5,102,134 | A | | 4/1992 | Smyth |
| 5,102,137 | A | | 4/1992 | Ekiert |
| 5,152,529 | A | | 10/1992 | Okada |
| 5,209,479 | A | | 5/1993 | Nagao et al. |
| 5,259,616 | A | | 11/1993 | Bergmann |
| 5,308,065 | A | | 5/1994 | Bridgeman et al. |
| 5,332,228 | A | | 7/1994 | Schultz |
| 5,342,047 | A | | 8/1994 | Heidel et al. |
| 5,342,049 | A | | 8/1994 | Wichinsky et al. |
| 5,344,144 | A | | 9/1994 | Canon |
| 5,364,100 | A | | 11/1994 | Ludlow et al. |
| 5,393,057 | A | | 2/1995 | Marnell, II |
| 5,393,061 | A | | 2/1995 | Manship et al. |
| 5,395,111 | A | | 3/1995 | Inoue |
| 5,423,539 | A | | 6/1995 | Nagao |
| 5,431,408 | A | | 7/1995 | Adams |
| 5,449,173 | A | | 9/1995 | Thomas et al. |
| 5,524,888 | A | | 6/1996 | Heidel |
| 5,542,669 | A | | 8/1996 | Charron et al. |
| 5,569,084 | A | | 10/1996 | Nicastro et al. |
| 5,580,053 | A | | 12/1996 | Crouch |
| 5,580,055 | A | | 12/1996 | Hagiwara |
| 5,584,764 | A | | 12/1996 | Inoue |
| 5,609,524 | A | | 3/1997 | Inoue |
| 5,611,535 | A | | 3/1997 | Tiberio |
| 5,647,798 | A | | 7/1997 | Falciglia |
| 5,697,843 | A | | 12/1997 | Manship et al. |
| 5,704,835 | A | | 1/1998 | Dietz, II |
| 5,722,891 | A | | 3/1998 | Inoue |
| 5,752,881 | A | | 5/1998 | Inoue |
| 5,766,074 | A | | 6/1998 | Cannon et al. |
| 5,769,716 | A | | 6/1998 | Saffari et al. |
| 5,772,506 | A | | 6/1998 | Marks et al. |
| 5,772,509 | A | | 6/1998 | Weiss |
| 5,775,692 | A | | 7/1998 | Watts et al. |
| 5,788,573 | A | | 8/1998 | Baerlocher et al. |
| 5,807,172 | A | | 9/1998 | Piechowiak |
| 5,810,361 | A | | 9/1998 | Kadlic |
| 5,816,915 | A | | 10/1998 | Kadlic |
| 5,823,534 | A | | 10/1998 | Banyai |
| 5,823,873 | A | | 10/1998 | Moody |
| 5,823,874 | A | | 10/1998 | Adams |
| 5,833,536 | A | | 11/1998 | Davids et al. |
| 5,833,537 | A | * | 11/1998 | Barrie ............................. 463/21 |
| 5,848,932 | A | | 12/1998 | Adams |
| 5,851,148 | A | | 12/1998 | Brune et al. |
| 5,863,249 | A | | 1/1999 | Inoue |
| 5,868,618 | A | | 2/1999 | Netley et al. |
| 5,868,619 | A | | 2/1999 | Wood et al. |
| 5,882,259 | A | | 3/1999 | Holmes, Jr. et al. |
| 5,882,261 | A | | 3/1999 | Adams |
| 5,890,962 | A | | 4/1999 | Takemoto |
| 5,902,184 | A | | 5/1999 | Bennett et al. |
| 5,919,088 | A | | 7/1999 | Weiss |
| 5,927,714 | A | | 7/1999 | Kaplan |
| 5,934,672 | A | | 8/1999 | Sines et al. |
| 5,935,002 | A | | 8/1999 | Falciglia |
| 5,944,315 | A | | 8/1999 | Mostashari |
| 5,947,820 | A | | 9/1999 | Morro et al. |
| 5,951,397 | A | | 9/1999 | Dickinson |
| 5,976,016 | A | | 11/1999 | Moody et al. |
| 5,980,384 | A | | 11/1999 | Barrie |
| 5,984,781 | A | | 11/1999 | Sunaga |
| 5,984,782 | A | | 11/1999 | Inoue |
| 5,997,400 | A | | 12/1999 | Seelig et al. |
| 5,997,401 | A | | 12/1999 | Crawford |
| 6,001,016 | A | * | 12/1999 | Walker et al. ................... 463/42 |
| 6,003,867 | A | | 12/1999 | Rodesch et al. |
| 6,004,207 | A | | 12/1999 | Wilson, Jr. et al. |
| 6,004,208 | A | | 12/1999 | Takemoto et al. |
| 6,015,346 | A | | 1/2000 | Bennett |
| 6,027,115 | A | | 2/2000 | Griswold et al. |
| 6,033,307 | A | | 3/2000 | Vancura |
| 6,056,642 | A | | 5/2000 | Bennett |
| 6,059,289 | A | | 5/2000 | Vancura |
| 6,059,658 | A | | 5/2000 | Mangano et al. |
| 6,062,980 | A | | 5/2000 | Luciano |
| 6,086,066 | A | | 7/2000 | Takeuchi et al. |
| 6,089,976 | A | | 7/2000 | Schneider et al. |
| 6,089,977 | A | | 7/2000 | Bennett |
| 6,089,978 | A | | 7/2000 | Adams |
| 6,093,102 | A | | 7/2000 | Bennett |
| 6,095,921 | A | | 8/2000 | Walker et al. |
| 6,102,798 | A | | 8/2000 | Bennett |
| 6,113,098 | A | | 9/2000 | Adams |
| 6,120,031 | A | | 9/2000 | Adams |
| 6,120,377 | A | | 9/2000 | McGinnis, Sr. et al. |
| 6,120,378 | A | | 9/2000 | Moody |
| 6,123,333 | A | | 9/2000 | McGinnis, Sr. et al. |
| 6,126,542 | A | | 10/2000 | Fier |
| 6,135,884 | A | | 10/2000 | Hedrick et al. |
| 6,142,873 | A | | 11/2000 | Weiss et al. |
| 6,142,874 | A | | 11/2000 | Kodachi et al. |
| 6,142,875 | A | | 11/2000 | Kodachi et al. |
| 6,146,273 | A | | 11/2000 | Olsen |
| 6,149,521 | A | | 11/2000 | Sandusky |
| 6,155,925 | A | | 12/2000 | Giobbi et al. |
| 6,159,095 | A | | 12/2000 | Frohm et al. |
| 6,159,096 | A | | 12/2000 | Yoseloff |
| 6,159,097 | A | | 12/2000 | Gura |
| 6,159,098 | A | | 12/2000 | Slomiany et al. |
| 6,162,121 | A | | 12/2000 | Morro et al. |
| 6,165,070 | A | | 12/2000 | Nolte et al. |
| 6,168,520 | B1 | | 1/2001 | Baerlocher et al. |
| 6,174,233 | B1 | | 1/2001 | Sunaga et al. |
| 6,174,234 | B1 | | 1/2001 | Seibert et al. |
| 6,174,235 | B1 | | 1/2001 | Walker et al. |
| 6,186,894 | B1 | | 2/2001 | Mayeroff |
| 6,190,254 | B1 | | 2/2001 | Bennett |
| 6,190,255 | B1 | | 2/2001 | Thomas et al. |
| 6,200,217 | B1 | | 3/2001 | Osawa |
| 6,203,429 | B1 | | 3/2001 | Demar et al. |
| 6,203,430 | B1 | | 3/2001 | Walker et al. |
| 6,210,279 | B1 | | 4/2001 | Dickinson |
| 6,213,876 | B1 | | 4/2001 | Moore, Jr. |
| 6,220,959 | B1 | | 4/2001 | Holmes, Jr. et al. |
| 6,224,483 | B1 | | 5/2001 | Mayeroff |
| 6,227,971 | B1 | | 5/2001 | Weiss |
| 6,231,442 | B1 | | 5/2001 | Mayeroff |
| 6,231,445 | B1 | | 5/2001 | Acres |
| 6,234,897 | B1 | | 5/2001 | Frohm et al. |
| 6,241,607 | B1 | | 6/2001 | Payne et al. |
| 6,251,013 | B1 | | 6/2001 | Bennett |
| 6,261,177 | B1 | | 7/2001 | Bennett |
| 6,261,178 | B1 | | 7/2001 | Bennett |
| 6,270,409 | B1 | | 8/2001 | Shuster |
| 6,270,411 | B1 | | 8/2001 | Gura et al. |
| 6,270,412 | B1 | | 8/2001 | Crawford et al. |
| 6,290,600 | B1 | | 9/2001 | Glasson |
| 6,299,165 | B1 | | 10/2001 | Nagano |
| 6,299,170 | B1 | | 10/2001 | Yoseloff |
| 6,302,398 | B1 | | 10/2001 | Vecchio |
| 6,302,790 | B1 | | 10/2001 | Brossard |
| 6,309,299 | B1 | | 10/2001 | Weiss |
| 6,309,300 | B1 | | 10/2001 | Glavich |
| 6,311,976 | B1 | | 11/2001 | Yoseloff et al. |
| 6,312,334 | B1 | | 11/2001 | Yoseloff |
| 6,315,660 | B1 | | 11/2001 | DeMar et al. |
| 6,315,663 | B1 | | 11/2001 | Sakamoto |
| 6,315,664 | B1 | | 11/2001 | Baerlocher et al. |
| 6,319,124 | B1 | | 11/2001 | Baerlocher |
| 6,322,078 | B1 | | 11/2001 | Adams |
| 6,328,649 | B1 | | 12/2001 | Randall et al. |

| | | | | |
|---|---|---|---|---|
| 6,334,814 | B1 | 1/2002 | Adams | |
| 6,336,860 | B1 | 1/2002 | Webb | |
| 6,346,043 | B1 | 2/2002 | Colin et al. | |
| 6,347,996 | B1 | 2/2002 | Gilmore et al. | |
| 6,358,144 | B1 | 3/2002 | Kaddlic et al. | |
| 6,358,147 | B1 | 3/2002 | Jaffe et al. | |
| 6,364,314 | B1 | 4/2002 | Canterbury | |
| 6,364,766 | B1 | 4/2002 | Anderson et al. | |
| 6,375,570 | B1 | 4/2002 | Poole | |
| 6,394,902 | B1 | 5/2002 | Glavich et al. | |
| 6,398,218 | B1 | 6/2002 | Vancura | |
| 6,398,220 | B1 | 6/2002 | Inoue | |
| 6,413,162 | B1 | 7/2002 | Baerlocher et al. | |
| 6,419,579 | B1 | 7/2002 | Bennett | |
| 6,435,511 | B1 | 8/2002 | Vancura et al. | |
| 6,439,943 | B1 | 8/2002 | Aoki et al. | |
| 6,439,993 | B1 | 8/2002 | O'Halloran | |
| 6,439,995 | B1 | 8/2002 | Hughs-Baird et al. | |
| 6,454,266 | B1 | 9/2002 | Breeding et al. | |
| 6,461,241 | B1 | 10/2002 | Webb et al. | |
| 6,464,581 | B1 | 10/2002 | Yoseloff et al. | |
| 6,471,208 | B2 | 10/2002 | Yoseloff et al. | |
| 6,491,584 | B2 | 12/2002 | Graham et al. | |
| 6,494,454 | B2 | 12/2002 | Adams | |
| 6,517,432 | B1 | 2/2003 | Jaffe | |
| 6,544,120 | B2 | 4/2003 | Ainsworth | |
| 6,547,242 | B1 | 4/2003 | Sugiyama et al. | |
| 6,551,187 | B1 | 4/2003 | Jaffe | |
| 6,558,254 | B2 | 5/2003 | Baelocher et al. | |
| 6,561,900 | B1 | 5/2003 | Baerlocher et al. | |
| 6,569,015 | B1 | 5/2003 | Baerlocher et al. | |
| 6,575,830 | B2 | 6/2003 | Baerlocher et al. | |
| 6,589,114 | B2 | 7/2003 | Rose | |
| 6,595,854 | B2 | 7/2003 | Hughs-Baird et al. | |
| 6,602,137 | B2 | 8/2003 | Kaminkow et al. | |
| 6,604,740 | B1 | 8/2003 | Singer et al. | |
| 6,604,999 | B2 | 8/2003 | Ainsworth | |
| 6,605,002 | B2 | 8/2003 | Baerlocher | |
| 6,609,971 | B2 | 8/2003 | Vancura | |
| 6,612,927 | B1 * | 9/2003 | Slomiany et al. | 463/16 |
| 6,616,142 | B2 | 9/2003 | Adams | |
| 6,632,139 | B1 | 10/2003 | Baerlocher | |
| 6,634,945 | B2 | 10/2003 | Glavich et al. | |
| 6,659,864 | B2 | 12/2003 | McGahn et al. | |
| 6,676,512 | B2 | 1/2004 | Fong et al. | |
| 6,715,756 | B2 | 4/2004 | Inoue | |
| 6,726,204 | B2 | 4/2004 | Inoue | |
| 6,854,732 | B2 | 2/2005 | Moody | |
| 6,855,056 | B2 | 2/2005 | Inoue | |
| 6,869,357 | B2 | 3/2005 | Adams et al. | |
| 6,880,826 | B2 | 4/2005 | Inoue | |
| 6,893,018 | B2 | 5/2005 | Inoue | |
| 6,896,617 | B2 | 5/2005 | Daly | |
| 6,960,133 | B1 | 11/2005 | Marks et al. | |
| 7,001,274 | B2 | 2/2006 | Baerlocher et al. | |
| 7,014,560 | B2 | 3/2006 | Glavich et al. | |
| 2001/0054794 | A1 | 12/2001 | Cole et al. | |
| 2002/0025844 | A1 | 2/2002 | Casey et al. | |
| 2002/0055382 | A1 | 5/2002 | Meyer | |
| 2002/0094857 | A1 | 7/2002 | Meyer | |
| 2002/0094862 | A1 | 7/2002 | Inoue | |
| 2002/0142829 | A1 | 10/2002 | Inoue | |
| 2002/0193160 | A1 | 12/2002 | Tarantino | |
| 2003/0013518 | A1 | 1/2003 | Graham | |
| 2003/0040355 | A1 | 2/2003 | Baerlocher | |
| 2003/0045345 | A1 | 3/2003 | Berman | |
| 2003/0092480 | A1 | 5/2003 | White et al. | |
| 2003/0203752 | A1 | 10/2003 | Kaminkow et al. | |
| 2003/0216165 | A1 | 11/2003 | Singer et al. | |
| 2003/0232643 | A1 | 12/2003 | Inoue | |
| 2004/0000754 | A1 | 1/2004 | Inoue | |
| 2004/0009803 | A1 | 1/2004 | Bennett et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0023714 | A1 | 2/2004 | Asdale | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0041340 | A1 | 3/2004 | Inoue | |
| 2004/0048650 | A1 | 3/2004 | Mierau et al. | |
| 2004/0053658 | A1 | 3/2004 | Rothranz | |
| 2004/0097280 | A1 | 5/2004 | Gauselmann | |
| 2004/0121840 | A1 | 6/2004 | Rosander et al. | |
| 2004/0155399 | A1 | 8/2004 | Inoue | |
| 2004/0183251 | A1 | 9/2004 | Inoue | |
| 2004/0192431 | A1 | 9/2004 | Singer et al. | |
| 2004/0195773 | A1 | 10/2004 | Masci et al. | |
| 2004/0242313 | A1 | 12/2004 | Munoz | |
| 2004/0242314 | A1 | 12/2004 | Casey | |
| 2004/0259625 | A1 | 12/2004 | Randall | |
| 2004/0259628 | A1 | 12/2004 | Randall | |
| 2005/0043083 | A1 | 2/2005 | Inoue | |
| 2005/0043084 | A1 | 2/2005 | Inoue | |
| 2005/0059478 | A1 | 3/2005 | Peterson et al. | |
| 2005/0192081 | A1 | 9/2005 | Marks et al. | |
| 2005/0277460 | A1 | 12/2005 | Inoue | |
| 2005/0282620 | A1 | 12/2005 | Marks et al. | |
| 2005/0288094 | A1 | 12/2005 | Marks et al. | |
| 2006/0040728 | A1 | 2/2006 | Fuller | |
| 2006/0046830 | A1 | 3/2006 | Webb | |
| 2006/0084492 | A1 | 4/2006 | Baerlocher et al. | |
| 2006/0111176 | A1 | 5/2006 | Kaminkow et al. | |

FOREIGN PATENT DOCUMENTS

| | | | |
|---|---|---|---|
| AU | 199747657 | B2 | 6/1998 |
| AU | 199917318 | B2 | 9/1999 |
| EP | 0 060 019 | A1 | 9/1982 |
| EP | 0 410 789 | A2 | 7/1990 |
| EP | 0 798 676 | A1 | 10/1997 |
| EP | 0 984 408 | A2 | 3/2000 |
| EP | 1 205 894 | A2 | 10/2001 |
| EP | 1 184 822 | A2 | 3/2002 |
| EP | 1 296 296 | A2 | 3/2003 |
| GB | 2 090 690 | A | 7/1982 |
| GB | 2 096 376 | A | 10/1982 |
| GB | 2 097 160 | A | 10/1982 |
| GB | 2 100 905 | A | 1/1983 |
| GB | 2 101 380 | A | 1/1983 |
| GB | 2 105 891 | A | 3/1983 |
| GB | 2 106 292 | A | 4/1983 |
| GB | 2 117 155 | A | 10/1983 |
| GB | 2 137 392 | A | 10/1984 |
| GB | 2 161 008 | A | 1/1986 |
| GB | 2 170 636 | A | 8/1986 |
| GB | 2 180 087 | A | 3/1987 |
| GB | 2 181 589 | A | 4/1987 |
| GB | 2 183 882 | A | 6/1987 |
| GB | 2 191 030 | A | 12/1987 |
| GB | 2 222 712 | A | 3/1990 |
| GB | 2 225 889 | A | 6/1990 |
| GB | 2 226 907 | A | 7/1990 |
| GB | 2 242 300 | A | 9/1991 |
| GB | 2316214 | | 2/1998 |
| GB | 2 328 311 | A | 2/1999 |
| GB | 2 393 019 | A | 3/2004 |
| WO | WO 01/15055 | A1 * | 3/2001 |
| WO | WO 01/87441 | A1 | 11/2001 |
| WO | WO 03/026758 | A1 | 4/2003 |
| WO | WO 2005/010831 | A2 | 6/2004 |
| WO | WO 2004/082779 | A2 | 9/2004 |
| WO | WO 2005/058444 | A1 | 12/2004 |
| WO | WO 2005/009560 | A2 | 2/2005 |
| WO | WO 2007/084766 | A2 | 7/2007 |

OTHER PUBLICATIONS

Aztec Temple Multiway Enhanced Video Slots Advertisement, written by IGT, available in 2005.

Barn Yard Advertisement, written by Aristocrat Technologies Inc., published prior to Nov. 10, 2006.

Barn Yard Article, published in Strictly Slots Mar. 2002.

Bonus Times Article, written by Bally Gaming, published in Strictly Slots Jul. 2000.

Carnival of Mystery Multiway Advertisement, written by IGT, available in 2005.

Dolphin Treasure Advertisement, written by Aristocrat, published in Jul. 1993.
Magic 8 Ball Advertisement, written by IGT, available in 2002.
Multi-Way Description, printed from www.igt.com/GamingGroup/Games/base.asp?pid-5.20 on May 3,2005.
Multiway Wagering Advertisement, written by IGT, available in 2005.
On the Money Advertisement, written by Casino Data Systems, published in Strictly Slots Dec. 2000.
Response to Dec. 2003 Final Office Action for U.S. Published Patent Application No. 2002/0039920.
"Slot Machines," written by Marshall Fey, published in 1989.
SnapShot Article, written by Aristocrat Technologies, published Strictly Slots in Aug. 2003.
Summary Judgment Order from *Aristocrat Technologies Australia Pty Limited*, and *Aristocrat Technologies, Inc.*, v. *International Game Technology and IGT*; U.S. District Court, District of Nevada, 2:05-CV-00820-BES (LRL), dated Apr. 20, 2007.
Supertimes Pay Poker Advertisement, written by IGT, available in 2003.
Sweet Hearts II game description, printed from Arcade-History.com on Feb. 6, 2006.
Take Your Pick Article, written by Anchor Games, published in Strictly Slots Mar. 2001.
Totem Pole Advertisement written by IGT, published in 1997.
Treasures of Troy Video Slots, written by IGT, printed from http://www.igt.com/GaminqGroup/Games/game_detail.asp?toggle=ovr&pid=5&type_id=4266&pl=&bhcp=1 on Oct. 2, 2007, available prior to Nov. 10, 2006.
Turbo Reel Article (with translation), published in Automaten Magazine Dec. 1989.
Turbo Reel Article with translation), written by Barcrest, published in Automaten Magazine Jan. 1990.
Wheel of Fortune Advertisement, written by IGT, available in 2002.
Wild Streak Article, written by WMS Gaming, published in Strictly Slots Mar. 2001.
Wizard Ways game description, printed from Arcade-History.com on Feb. 15, 2006.
X Factor Advertisement, written by WMS Gaming, Inc., published in 1998.

* cited by examiner

| Paytable | |
|---|---|
| 7 7 7 | 10 |
| 7 7 7 7 | 20 |
| 7 7 7 7 7 | 50 |
| 3 bells | 10 |
| 4 bells | 30 |
| 5 bells | 75 |
| bar bar bar | 100 |
| 3 oranges | 300 |

GAMING SYSTEM AND METHOD HAVING WAGER DEPENDENT DIFFERENT SYMBOL EVALUATIONS

COPYRIGHT NOTICE

This application is a non-provisional application of, claims priority to and the benefit of U.S. Provisional Patent Application Ser. No. 60/865,291, filed on Nov. 10, 2006, the entire contents of which are incorporated herein by reference.

PRIORITY CLAIM

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Certain known gaming devices use mechanical devices such as reels, wheels or spheres to enhance the attraction of the gaming machines to players and also to enhance the player's game playing experience. These mechanical devices enable a player to see physical movements of a game, a portion of a game, or a functional game event or element which increases the player's enjoyment of the game.

In one known slot gaming device, the gaming device includes a plurality of reels and one or more paylines. Such gaming devices include any suitable number of reels, such as three to five reels, which each display any suitable number of symbols per reel, such as three symbols per reel. In these gaming devices, the player initiates the spinning of the reels by making one or more wagers on one or more paylines. Such gaming devices may have one, three, five, nine, fifteen, twenty-five or any other suitable number of paylines which are horizontal, vertical, diagonal or any combination thereof. One type of gaming device includes a payline associated with each possible combination of symbol positions, wherein each payline passes through only one symbol position on each reel. The player wagers on a player selected number or combination of paylines, such as one, two, three, five, ten or fifteen paylines.

Multiple paylines present multiple opportunities for the player to obtain winning symbol combinations. Usually, players have to wager more to obtain the benefit of the multiple paylines. For example, a player may wager 1 credit to wager on one payline and 2 credits to wager on two paylines.

After the player wagers on one or more paylines, the reels spin and generate a plurality of symbols. The gaming device analyzes the generated symbols to determine if the gaming device has randomly generated a winning symbol or winning symbol combination on or along one or more of the wagered on paylines. Any awards associated with any generated winning symbols or winning symbol combinations generated along any wagered on paylines are provided to the player.

In these gaming devices, the awards provided to the player are generally based on the number of paylines that pass through each of the winning symbol combinations. That is, the gaming device separately analyzes each wagered on payline to determine if a winning symbol combination is generated on that payline. For each occurrence of each payline passing through a winning symbol combination, the gaming device provides the player the award associated with that winning symbol combination. For example, in a five reel gaming device, if four related symbols (which form a winning symbol combination) are generated by the first four reels and twelve paylines pass through the first three of those related symbols (i.e., three paylines running left to right pass through all four related symbols and nine paylines running left to right pass through the first three related symbols), the gaming device provides the player twelve awards (i.e., one award for each payline that passes through the winning symbol combination). These twelve separate awards are each for the single occurrence of the winning symbol combination including the four related symbols. Accordingly, in a gaming device with wagering on paylines, the greater the number of wagered on paylines, the greater the number of evaluations performed by the gaming device to determine if winning symbol combinations are generated on the wagered on paylines. Also, the greater the number of wagered on paylines that pass through a winning symbol combination, the greater the award as compared to an identical winning symbol combination in which fewer wagered on paylines pass through the same winning symbol combination.

In certain known gaming devices, a player must wager on the maximum number paylines ("max lines") to be eligible to win a bonus. In certain other known gaming devices the player must wager maximum number of credits per payline ("max credits").

In another type of gaming device with reels, the player wagers on a number of ways to win, wherein any award provided to the player is based on the number of associated symbols which are generated in active symbol positions on a requisite number of adjacent reels. In such ways to win gaming devices, the gaming device determines any outcome to provide to the player based on the number of associated symbols which are generated in active symbol positions on a requisite number of adjacent reels (i.e., not on paylines passing through any displayed winning symbol combinations).

Many known gaming devices enable players to make one or more side bets or side wagers. Such side bets are additional wagers placed by the player for each individual play of the game. The player's side bet provides the player a chance of obtaining a supplemental award in the play of the game, in addition to the player's existing chance of obtaining a first award. Awards are sometimes based on these side bets. Players sometimes place side bets to qualify for a type of game function or game event. For example, a player may make a side bet in order to become eligible for a bonus game or a bonus feature.

A need exists to provide a gaming device and method which provides a plurality of different types of symbol evaluations and enables the player to have additional award opportunities in the game.

SUMMARY

The present disclosure is directed to a gaming device which provides one or more different types of symbol evaluation based on the amount wagered by a player in a game. In one embodiment, the gaming device includes a plurality of different types of symbol evaluations, each type of symbol evaluation being associated with a different wager amount. If the player wagers a first wager amount to cause a play of the game, the gaming device provides a first type of symbol evaluation of the generated symbols for that play of the game. If the player wagers a second higher wager amount to cause a play of the game, the gaming device additionally provides a second different type of symbol evaluation of the same generated symbols for that play of the game. In one embodiment, different types of symbol evaluation are associated with different average expected payouts (relative to the amount wagered) for the player.

It should be appreciated that there can be any combination of at least two different types of symbol evaluation in a play of the game. However, two types of symbol evaluation are used throughout to more easily convey the concepts of the present disclosure.

In one embodiment, if the player places the first wager amount, the gaming device provides a payline evaluation of the generated symbols for that play of the game. If the player places the second wager amount, the gaming device also provides a ways to win evaluation of the same generated symbols for that play of the game. In one preferred embodiment, none of the generated symbols change or change position for the different evaluations. In another embodiment, one or more of the symbols change or change position for certain types of symbol evaluation, such as a cascading symbol evaluation, as will be discussed in more detail below.

In one embodiment, the gaming device includes a plurality of symbol generators with a plurality of symbols on or associated with each symbol generator. In one embodiment, the symbol generators are reels which are operable to generate symbols at a plurality of symbol positions associated with the reels. Each reel is adapted to generate and display any suitable number of symbols in the symbol positions associated with that reel. Alternatively, one or more of the reels may be independent or unisymbol reels. Each independent reel is adapted to generate and display a single one of the symbols on that independent reel in a single symbol position associated with that reel. One or more paylines are associated with the symbol positions. In one embodiment, the gaming device enables the player to wager on one or more paylines. In another embodiment, the gaming device enables the player to wager on all of the paylines. After receiving the player's wager, the gaming device activates the reels to generate a symbol in each of the symbol positions.

For example, the gaming device enables the player place a first wager amount, such as 50 credits, or a second wager amount, such as 100 credits. If the player wagers 50 credits, the gaming device activates the reels to generate a symbol in each of the symbol positions. The gaming device evaluates the symbols generated along any wagered on paylines to determine whether any winning symbol combinations are indicated. The gaming device provides the player with any awards corresponding to any winning symbol combinations that are indicated on the paylines.

If the player places the second wager amount of 100 credits, the gaming device provides the payline evaluation, as described above. Additionally, the gaming device provides a ways to win evaluation. In the ways to win evaluation, as will be discussed below, the gaming device determines whether the generated symbols form any strings of a designated number of related symbols. If one or more strings of related symbols are formed, the gaming device evaluates the symbols of each string of related symbols to determine whether those symbols correspond to any winning symbol combinations. The gaming device provides any awards associated with such winning symbol combinations to the player.

In one such embodiment, the second wager amount is greater than the first wager amount. In one embodiment, the second wager amount includes the first wager amount. In different embodiments, the first and second wagers may be placed together or separately.

It should be appreciated that, if the player places the second wager amount, the gaming device provides the player with any awards determined in both the payline evaluation and the ways to win evaluation. Thus, by placing the second wager, the player obtains two different types of symbol evaluation, as a result, more opportunities to win awards in the play of the game.

In one alternative embodiment, rather than providing the payline evaluation as the first type of symbol evaluation and the ways to win evaluation as the second type of symbol evaluation, the first type of symbol evaluation is a ways to win evaluation and the second type of symbol evaluation is a payline evaluation. In this embodiment, if the player places the first wager amount, the gaming device provides the ways to win evaluation, and if the player places the second wager amount, the gaming device additionally provides the payline evaluation.

In one embodiment, the game operator or designer determines the order of the different types of symbol evaluation. In one alternative embodiment, the gaming device enables the player to select the order of the different types of symbol evaluation. That is, the player selects which type of symbol evaluation will be the first symbol evaluation and which type of symbol evaluation will be the second symbol evaluation. For example, the player could choose to have the gaming device perform a scatter-type symbol evaluation of the generated symbols and then perform a payline evaluation of the same generated symbols. In one embodiment, the player's wager can affect the order in which the different types of symbol evaluation are provided.

One embodiment of the present disclosure includes a trumping feature, whereby a certain type or certain types of symbol evaluations trump other types of symbol evaluations. In one such embodiment, the type of symbol evaluation that occurs first trumps the type of symbol evaluation that occurs second. For example, in a gaming device where the first type of symbol evaluation is the payline evaluation, the gaming device analyzes the symbols generated along each wagered on payline and provides any awards corresponding to any generated winning symbol combinations. When the gaming device evaluates the wagered on ways to win (i.e., performs the second type of symbol evaluation on the same generated symbols), the gaming device does not provide an award for any string of related symbols corresponding to winning symbol combinations that also appears along one of the paylines. That is, the gaming device only provides awards for any formed strings of related symbols that correspond to winning symbol combinations and that do not overlap with winning symbol combinations generated along the wagered on paylines.

It should be appreciated that, in certain embodiments including the trumping feature, the order in which the gaming device performs the different types of symbol evaluation affects which type or types of symbol evaluation will trump any other types symbol evaluations provided in a play of the game.

Any suitable type of symbol evaluation may be associated with any of the wager amounts. Examples of types of symbol evaluation include, but are not limited to, a payline evaluation, a ways to win evaluation, a true scatter symbol evaluation, a cascading symbol evaluation, an evaluation to determine eligibility for a bonus event, an evaluation to determine eligibility for a progressive award, an evaluation to determine eligibility for a multilevel progressive award, and an evaluation to determine eligibility for a group event or a tournament.

It should be appreciated that the gaming device of the present disclosure may include more than two different wager amounts which correspond to different types of symbol evaluation. Thus, players can obtain multiple different types of symbol evaluation in the game by meeting certain wagering requirements or levels.

For example, in one embodiment, if the player wagers a third higher wager amount, the gaming device provides a third different type of symbol evaluation in addition to the payline and ways to win evaluations. In one such embodiment, the third type of symbol evaluation is a bonus trigger evaluation. If it is determined that the player has wagered the third wager amount, the gaming device evaluates the generated symbols to determine whether a bonus trigger is indicated. If the gaming device determines that the bonus trigger is indicated by the generated symbols, the player wins the opportunity to participate in a bonus event.

In one alternative embodiment, the gaming device includes different ranges of wager amounts, wherein each different range of wager amounts is associated with a different type of symbol evaluation. In one such embodiment, if the player's wager is in a first range of wager amounts, the gaming device provides the payline evaluation. If the player's wager is in the second range of wager amounts, the gaming device provides the ways to win evaluation in addition to the payline evaluation.

In this embodiment, the first range of wager amounts includes a plurality of different wager amounts, wherein for example, each different wager amount corresponds to a different number of paylines. For example, a first wager amount of 30 in the first range of wager amounts corresponds to 3 paylines, and a second wager amount of 50 in the first range of wager amounts corresponds to 5 paylines.

In one such embodiment, the gaming device enables the player to cause a play of the game by placing one of the different wager amounts from the first range of wager amounts to wager on a desired number of paylines. In one example embodiment, the gaming device includes 5 paylines and requires a wager of 10 credits for each payline. The first range of wager amounts includes wager amounts of 10, 20, 30, 40, and 50 credits. If the player wagers 10 credits, the player wagers on 1 of the paylines. If the player wagers 50 credits, the player wagers on all 5 paylines. For each wagered on payline, the gaming device determines whether the symbols generated along that payline include any winning symbol combinations. The gaming device provides any awards corresponding to any indicated winning symbol combinations.

In one such embodiment, after receiving the player's wager on one or more of the available paylines, the gaming device determines whether the player has wagered on a required number of the paylines. If the player has wagered on the required number of paylines, the gaming device enables the player to place an additional wager to obtain one or more different types of symbol evaluation, in addition to the payline evaluation.

The gaming device determines whether the player places the additional wager. If the first wager amount in combination with the additional wager, or the total amount wagered, is in the second range of wager values, the gaming device provides the ways to win evaluation in addition to the payline evaluation. If the player does not place the additional wager, the gaming device provides the payline evaluation and evaluates the symbols generated on any wagered on paylines.

In one such embodiment, the required number of paylines that the player must wager on to be eligible to place the additional wager is all of the paylines. For instance, if the gaming device includes 5 paylines and requires a wager of 10 coins for each payline, the player must wager 50 coins to wager on all of the paylines. If the player wagers 50 coins, the gaming device enables the player to place the additional wager. After the player places the additional wager, if the total amount wagered is in the second range of wager amounts, the gaming device provides the ways to win evaluation in addition to the payline evaluation. In another embodiment, the required number of paylines on which the player must wager to qualify to place the additional wager is less than all of the paylines.

In another alternative embodiment, rather than wagering on individual paylines and/or individual ways to win, the player wagers on groups of paylines and/or groups of ways to win. In one such embodiment, if the player wagers a first wager amount, the player wagers on all of the paylines. If the player wagers a second wager amount, the player wagers on all of the paylines and all of the ways to win. In another embodiment, the player wagers on a group or groups including less than all of the paylines or less than all of ways to win (such as half the paylines and half the ways to win).

In one embodiment, the gaming device provides a plurality of different predefined wager amounts. Each wager amount is associated with one or more different types of symbol evaluation. In operation of one such embodiment, the gaming device enables a player to cause a play of the game by wagering an amount equal to one of the different predefined wager amounts available to the player. In this embodiment, the types of symbol evaluation associated with the selected wager amount are provided to the player for the play of the game. Such a configuration enables players to have a greater level of control over how their wager is applied to the game. Moreover, such a configuration reduces possible confusion regarding which of the different types of symbol evaluation are available in the game and how to get certain of these types of symbol evaluation.

In one such embodiment, each of the predefined wager amounts is associated with a separate input device such as a button. In this embodiment, the player selects one of the predefined wager amounts (via the input device) to cause a play of the game. After the player selects a predefined wager amount, the gaming device performs the type or types of symbol evaluation associated with the selected wager amount in the play of the game. It should be appreciated that the gaming device disclosed herein enables a gaming device designer or manufacturer to incorporate any suitable type of symbol evaluation into any suitable predefined wager amount.

For example, the chart below illustrates one of the many possible setups for the different types of symbol evaluations that are provided for different wager amounts:

| $1 | $2 | $3 |
|---|---|---|
| Payline Evaluation | Payline Evaluation<br>Ways to Win Evaluation | Payline Evaluation<br>Ways to Win Evaluation<br>Bonus Trigger Evaluation |

As can be seen from the above chart, each time the player increments the wager amount, the player obtains a new different type of symbol evaluation, rather than wagering on another payline or another way to win. Thus, the need for the player to select individual paylines or ways to win to wager on is eliminated. It should be appreciated that in the example above, the wager amounts increment linearly (i.e., the wager increases by $1 for each additional type of symbol evaluation). However, in alternative embodiments, the different wager amounts may increment non-linearly.

It should be also appreciated that any suitable type of symbol evaluation may be associated with any of the different wager amounts. Additionally, the gaming device may include any number of different wager amounts which correspond to different types of symbol evaluation.

In one embodiment, the gaming device enables the gaming device designer to select which types of symbol evaluation will be provided for a particular wager amount. In one such embodiment, the wager amount associated with a group of different symbol evaluations is based on the average expected payouts associated with each of the different types of symbol evaluation. In another embodiment, the gaming device enables the player to select which types of symbol evaluation the player would like the gaming device to perform in the game. The gaming device determines a wager amount that the player must pay for the player-selected symbol evaluations (based on the average expected payouts associated with the player-selected types of symbol evaluation).

For example, the chart below shows another possible setup for the different types of symbol evaluations that are provided for five different wager amounts:

| $1 | $2 | $3 | $4 | $5 |
|---|---|---|---|---|
| Ways to Win Evaluation | Ways to Win Evaluation<br>Payline Evaluation | Ways to Win Evaluation<br>Payline Evaluation<br>Bonus Trigger Evaluation | Ways to Win Evaluation<br>Payline Evaluation<br>Bonus Trigger Evaluation<br>Progressive Evaluation | Ways to Win Evaluation<br>Payline Evaluation<br>Bonus Trigger Evaluation<br>Progressive Evaluation<br>Multilevel Progressive Evaluation |

In one embodiment, the gaming device provides a cascading symbol evaluation. In this embodiment, after the gaming device activates the reels to generate a symbol in each of the symbol positions, the gaming machine determines if a winning combination occurs along one or more of the paylines or ways to win. The gaming device provides an award to the player for that combination and eliminates the symbols in each winning combination. The gaming device randomly generates additional symbols that are displayed and subsequently fall into the symbol positions vacated by the eliminated symbols. In one such embodiment, the gaming device continues providing any awards for winning combinations and replacing those winning combinations until a winning combination is no longer formed.

In one embodiment, the cascading evaluation is the last symbol evaluation provided to analyze the generated symbols. In different embodiments, the gaming device provides the cascading evaluation after the payline evaluation, after the ways to win evaluation, after both the payline and ways to win evaluations, or after any other type or combination of symbol evaluations.

For example, the chart below illustrates a possible setup for the different types of symbol evaluations that are provided for different wager amounts, wherein the cascading symbol evaluation is provided last:

| $1 | $2 | $3 | $4 | $5 |
|---|---|---|---|---|
| Payline Evaluation | Payline Evaluation<br>Ways to Win Evaluation | Payline Evaluation<br>Ways to Win Evaluation<br>Scatter Evaluation | Payline Evaluation<br>Ways to Win Evaluation<br>Scatter Evaluation<br>Bonus Evaluation | Payline Evaluation<br>Ways to Win Evaluation<br>Scatter Evaluation<br>Bonus Trigger Evaluation<br>Cascading Evaluation |

Accordingly, wagering an amount associated with additional symbol evaluations enables the player to have additional award opportunities in the game that would otherwise not be available to the player.

It is therefore an advantage of the present disclosure to provide a gaming device which provides different types of symbol evaluations in a game.

Another advantage of the present disclosure is to provide a gaming device wherein each time the player increments the wager amount, the player obtains a new different type of symbol evaluation.

Other objects, features and advantages will be apparent from the following detailed disclosure, taken in conjunction with the accompanying sheets of drawings, wherein like numerals refer to like parts, elements, components, steps and processes.

Additional features and advantages are described in, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
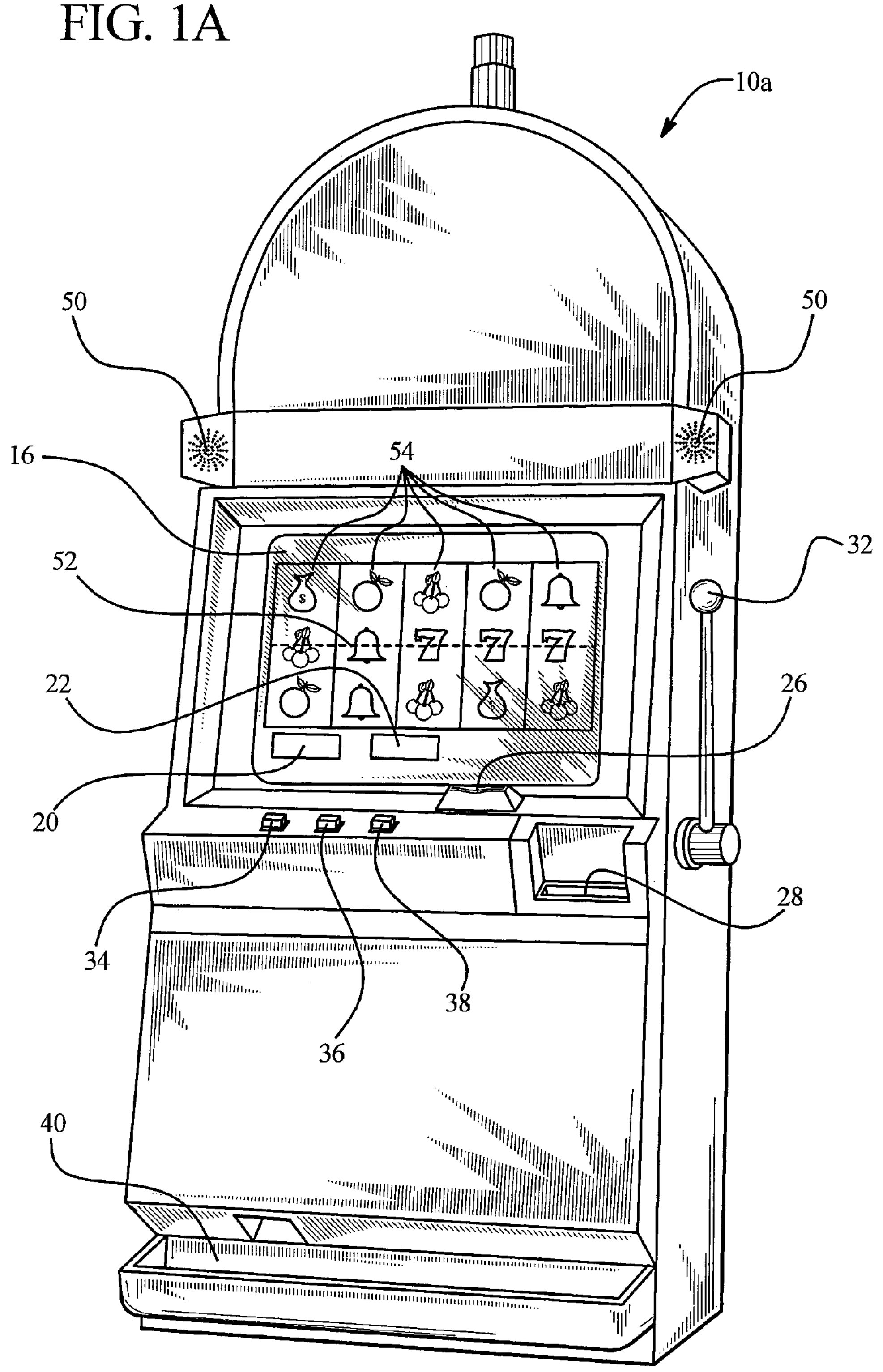
FIGS. 1A and 1B are perspective views of example alternative embodiments of the gaming device of the present disclosure.
Figure 1B:
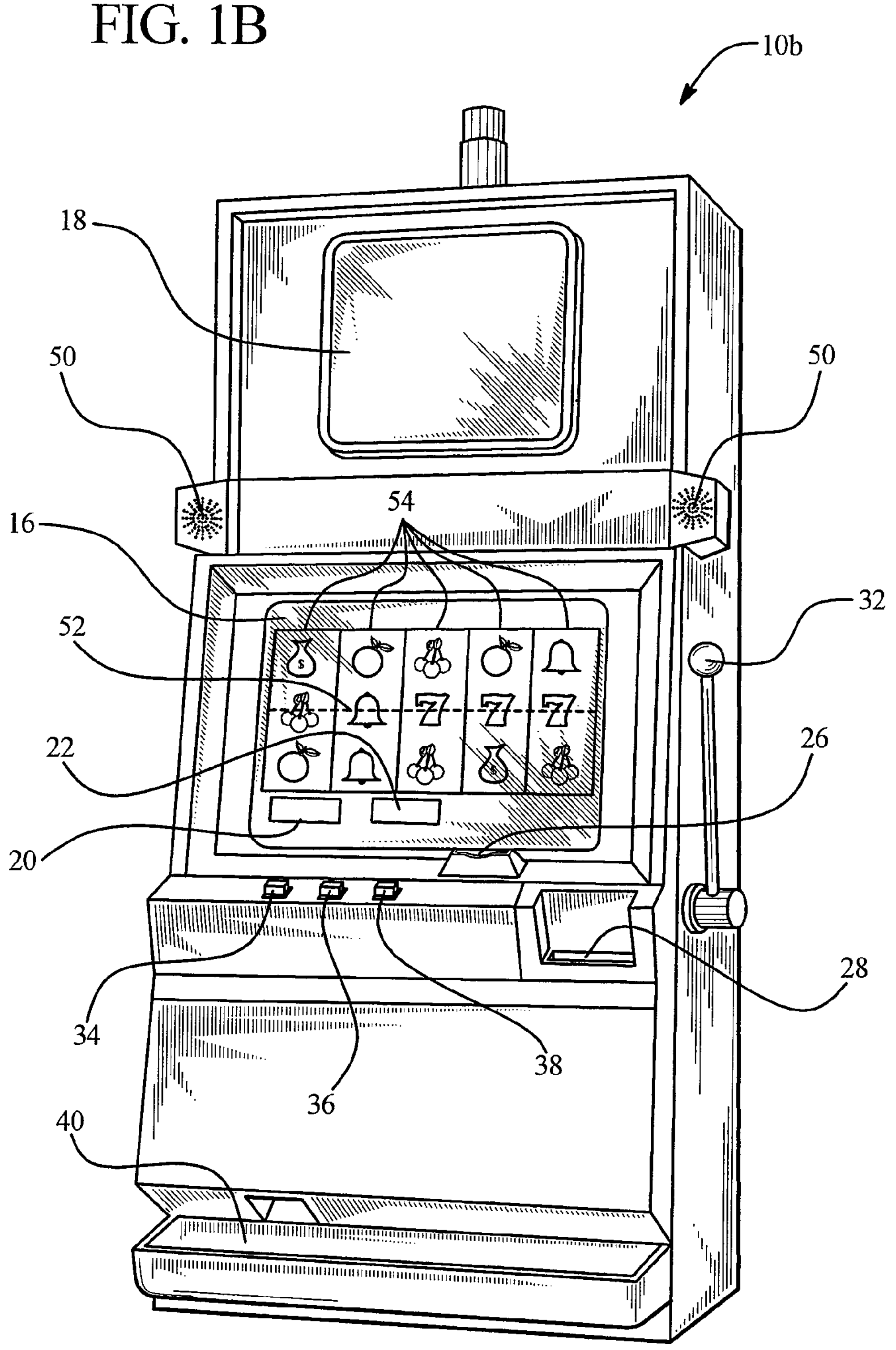

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
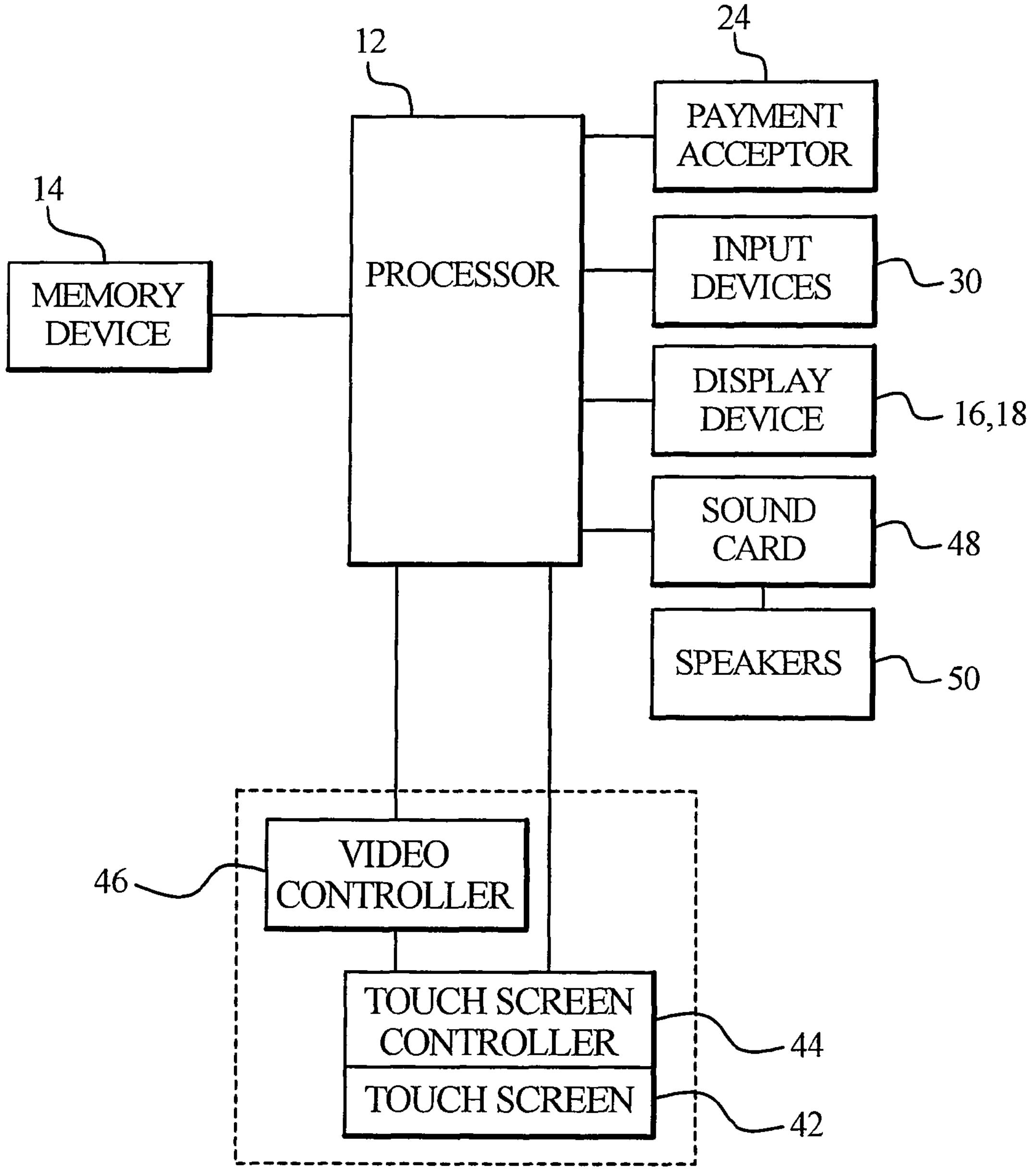
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

In one embodiment, the gaming device includes at least one and preferably a plurality of reels 72, 74, 76, 78, and 80, such as three to five reels, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 72, 74, 76, 78, and 80 are in video form, one or more of the display devices, as described above, display the plurality of simulated video reels 72, 74, 76, 78, and 80. Each reel 72, 74, 76, 78, and 80 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In some embodiments, the ways to win game is applied to a secondary or bonus game, which is played in combination with a base or primary game. If the ways to win game is applied to a bonus game, it operates with one or more base or primary games. In different embodiments in which the ways to win game is a bonus game, different primary wagering games, such as slot games, video poker games, video blackjack games, video keno, video bingo, or any other suitable primary or base game may be implemented. In one embodiment, the base game is provided on the central display device 30, while the bonus game is played on the upper display device 32 (FIG. 1B).

In one such embodiment, if the ways to win game disclosed herein is implemented as a bonus game, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another such embodiment, if the ways to win game is implemented as a bonus game, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In another such embodiment, if the ways to win game is a bonus game, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. In such embodiments, the ways to win game disclosed herein is implemented as a primary or base game. For example, if the ways to win game is a primary game, achieving a certain qualifying condition or triggering event in the primary game triggers a separate bonus game. In some embodiments, if the ways to win game is applied to a base or primary game, the bonus game may be any type of suitable game, either similar to or completely different from the base or primary game.

The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
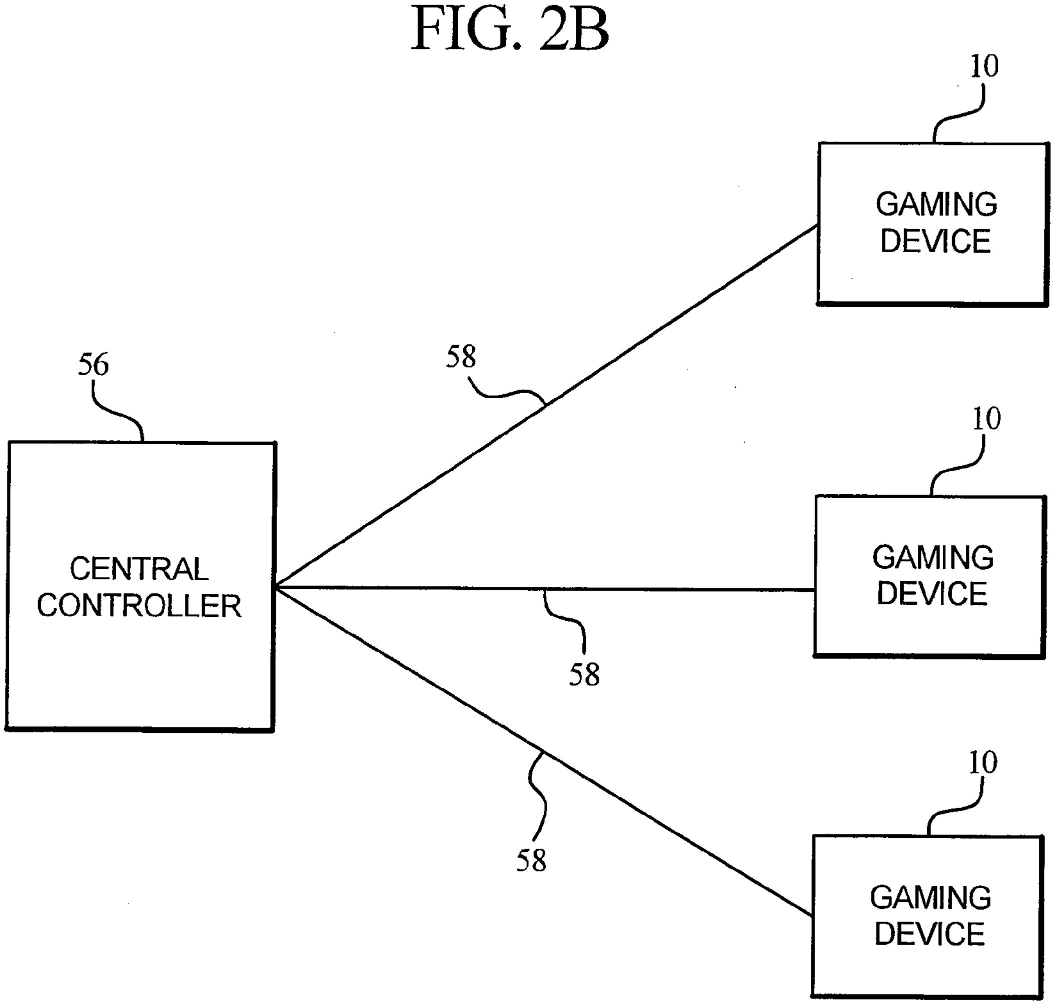
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards.

In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Wager Dependent Symbol Evaluations

The present disclosure is directed to a gaming device including a game operable upon a wager by a player. The gaming device provides one or more different types of symbol evaluation in the game based on the amount wagered by a player. In one embodiment, different types of symbol evaluation are associated with different average expected payouts (relative to the amount wagered) for the player.

Figure 3:
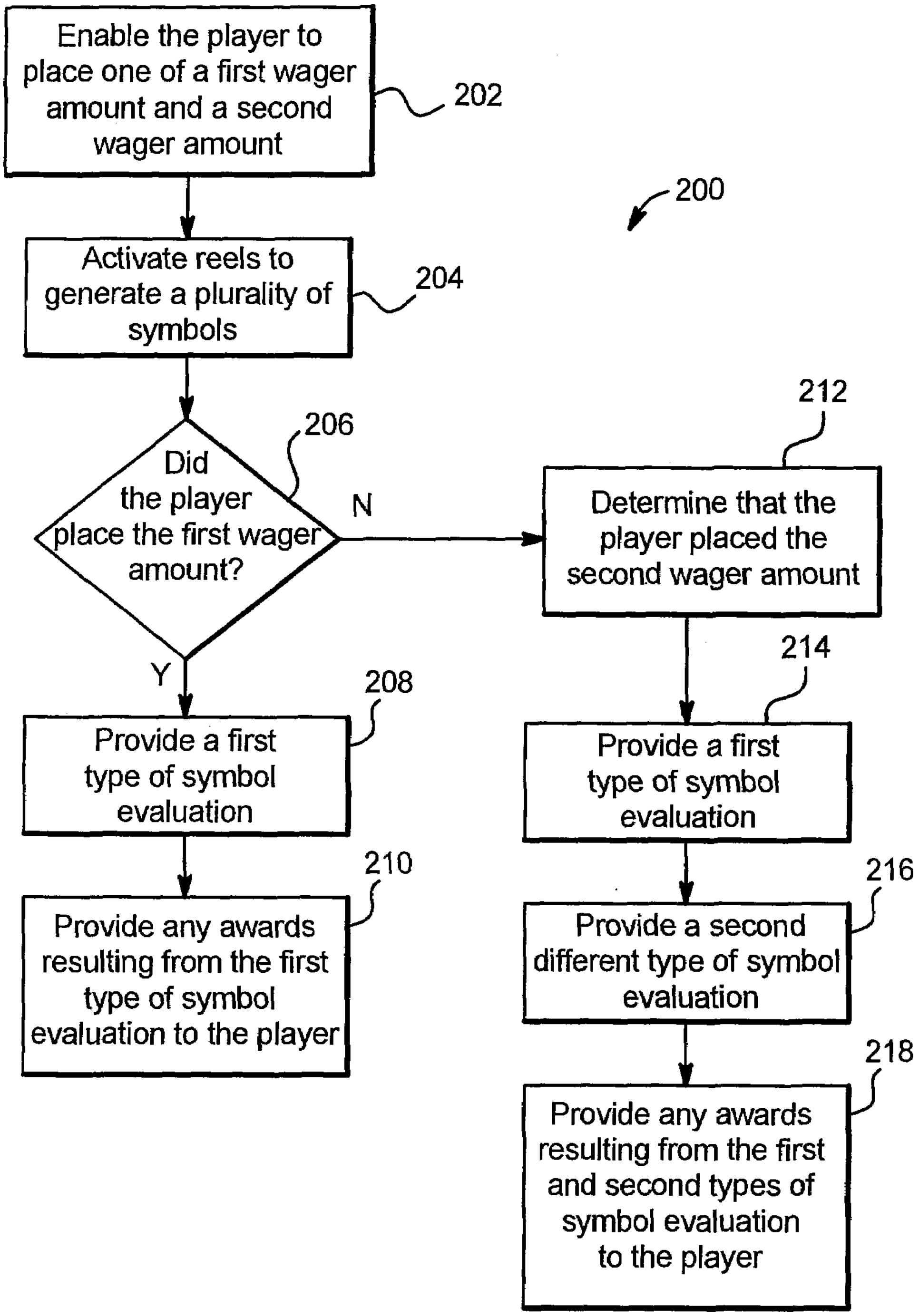
FIG. 3 is flow chart illustrating one embodiment of the present disclosure.

Referring now to FIG. 3, one embodiment the present disclosure operates according to sequence 200. In one such embodiment, the gaming device includes a plurality of different types of symbol evaluation, each type of symbol evaluation associated with a wager amount. If the player wagers a first wager amount, the gaming device provides a first type of symbol evaluation to determine whether the player wins any awards based on the symbols generated on the reels. If the player wagers a second wager amount, the gaming device provides a second different type of symbol evaluation in addition to the first type of symbol evaluation. In certain embodiments, the second wager amount is greater than or includes the first wager amount.

More specifically, as indicated by block 202, the gaming device enables a player to place one of the first wager amount and the second wager amount to cause a play of the game. Upon receiving the player's wager, the gaming device activates the reels to generate a plurality of symbols, as indicated by block 204.

The gaming device determines whether the player has placed the first wager amount, as indicated by diamond 206. If the gaming device determines that the player has placed the first wager amount, the gaming device provides the first type of symbol evaluation, as indicated by block 208. The gaming device provides to the player any awards determined as a result of the first symbol evaluation, as indicated by block 210.

If the gaming device determines, in connection with diamond 206, that the player did not place the first wager amount, the gaming device determines that the player wagered the second wager amount, as indicated by block 212. After determining that the player has wagered the second amount, the gaming device provides the first type of evaluation and a second type of evaluation, as indicated by blocks 214 and 216, respectively. The gaming device provides any awards determined as a result of the first and second types of evaluations, as illustrated by block 218.

In one example embodiment of the gaming device operating according to sequence 200, the first type of symbol evaluation is a payline evaluation and the second type of symbol evaluation is a ways to win evaluation. In this embodiment, the gaming device enables the player to place one of the first wager amount or the second wager amount to cause a play of the game.

The gaming device generates a plurality of symbols on the reels. If it is determined that the player placed the first wager amount and not the second wager amount, the gaming device evaluates the symbols generated along each wagered on payline and determines whether the symbols generated along that payline correspond to any winning symbol combinations. If it is determined that the player placed the second wager amount, the gaming device provides the payline evaluation, as described above. Additionally, the gaming device provides the ways to win evaluation.

In the ways to win evaluation, after one of the symbols has been generated and displayed in each of the symbol positions, the gaming device identifies certain of the symbol positions as active symbol positions. Once the gaming device has identified the active symbol positions, the gaming device determines whether any of the symbols displayed in active symbol positions associated with a first one of the reels are related to any of the symbols generated in active symbol positions associated with a second one of the reels. For a first symbol in an active symbol position associated with the first reel, the gaming device determines whether any symbols in any active symbol positions associated with the second reel are related to the first symbol. In one embodiment, symbols generated in active symbol positions are related if they form part or all of a winning symbol combination or are otherwise suitably related.

If the first symbol in the active symbol position associated with the first reel and a symbol in an active symbol position associated with the second reel are related (i.e., form all or part of a winning symbol combination), the gaming device classifies such symbols as related symbols. After determining whether the first symbol in the active symbol position on the first reel forms a string of related symbols with any symbols generated in the active symbol positions on the second reel, the gaming device repeats the process described above for any remaining symbols generated in an active symbol position on the first reel.

For each classified string of related symbols, the gaming device determines whether any of the symbols generated in an active symbol position associated with the next adjacent reel (i.e., a third reel) are related to that string of related symbols. If none of the symbols in an active symbol position associated with the next adjacent reel are related to the strings of related symbols, the gaming device marks or flags such string of related symbols complete. If a symbol in an active symbol position associated with the next adjacent reel is related to the symbols in the string of related symbols, the gaming device adds this related symbol to the string of related symbols. This process is repeated until either each of the strings of related symbols is complete, or until there are no more reels adjacent to the last reel which includes one of the related symbols.

When each of the strings of related symbols is marked complete, the gaming device determines any outcomes, such as any awards, associated with any formed winning symbol combinations and provides any determined outcomes to the player. It should be appreciated that, in such ways to win symbol evaluations, the number of ways to win depends on the number of strings of related symbols that are formed, and is not based on any displayed winning symbol combinations along wagered on paylines.

In one alternative embodiment, the gaming device includes different ranges of wager amounts, wherein each range of wager amounts is associated with a different type of symbol evaluation. The range of wager amounts associated with each type of symbol evaluation may be predetermined, randomly determined, determined based on the wagers placed in the gaming system, determined based on the status of one or more players (such as determined through a player tracking system), determined based on time, or determined based on any other suitable method.

In one such embodiment, if the player's wager is in a first range of wager amounts, the gaming device provides a first type of symbol evaluation. If the player's wager is in a second range of wager values, the gaming device provides a second type of symbol evaluation in addition to the first type of symbol evaluation.

In one example embodiment, the first type of symbol evaluation is a payline evaluation and the second type of symbol evaluation is a ways to win evaluation. In one such embodiment, the first range of wager amounts includes a plurality of different wager amounts wherein each different wager amount corresponds to a different number of paylines. The gaming device enables the player to initiate a play of the game by wagering one of the different wager amounts from the first range of wager amounts. For example, if the gaming device includes 5 paylines and requires a wager of 10 credits for each payline, the first range of wager amounts includes wager amounts of 10, 20, 30, 40, and 50 credits. If the player wagers 10 credits, the player wagers on 1 of the paylines. If the player wagers 50 credits, the player wagers on all 5 paylines. For each wagered on payline, the gaming device determines whether the symbols generated along that payline include any winning symbol combinations. The gaming device provides any awards corresponding to any indicated winning symbol combinations.

In one embodiment, the second range of wager amounts includes a plurality of wager amounts wherein each different wager amount corresponds to a different number of ways to win. In ways to win gaming devices, as is known in the art, the number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a five reel game with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel).

In the five reel game described in the above example, if the player wishes to wager on all 243 ways to win in addition to any wagered on paylines, the player must wager the highest wager amount in the second range of wager amounts. Alternatively, if the player wishes to wager on less than all of the ways to win in addition to any wagered on paylines, the player wagers a lower wager amount in the second range of wager amounts.

In one embodiment, each different type of symbol evaluation that is available in the game corresponds to a different range of wager amounts. In an alternative embodiment, each different type of symbol evaluation corresponds to a different single wager amount. In a further alternative embodiment, the gaming device includes a mix of ranges of wager amounts and single wager amounts, wherein some of the available types of symbol evaluation correspond to ranges of wager amounts and some of the available types of symbol evaluation correspond to single wager amounts. For example, a player may place a wager amount between 1 and 5 credits, to wager on a number of paylines, up to a maximum of 5 paylines available in a game (i.e., 1 credit to wager on each payline). Additionally, the player may wager an additional single wager amount equal to 5 credits to wager on all of the ways to win in the game. The player could subsequently wager a further additional wager amount equal to 5 credits for a bonus trigger evaluation. Thus, in this example, the payline evaluation corresponds to a range of wager amounts, whereas the ways to win and bonus trigger evaluations correspond to single wager amounts.

In one embodiment, the gaming device provides a plurality of different predefined wager amounts associated with one or more different types of symbol evaluations. In operation of one such embodiment, the gaming device enables players to cause a play of the game by wagering an amount equal to one of the different predefined wager amounts available to the player. The types of symbol evaluation associated with the player-selected wager amount are provided to the player for the play of the game.

In one embodiment, the gaming device designer selects the types of symbol evaluation that are provided for a particular wager amount. In one such embodiment, the wager amount associated with a group of different symbol evaluations is based on the average expected payouts associated with each of the different types of symbol evaluation. In another embodiment, the gaming device enables the player to select which types of symbol evaluation to use in the game, and the gaming device determines a wager amount that the player must pay for the player-selected types of symbol evaluation (based on the average expected payouts associated with the selected types of symbol evaluation). In one such embodiment, one or more of the determined predefined wager amounts corresponding to a player's preferred types of symbol evaluation are stored for the player in association with a suitable player tracking system. In different embodiments, the player is enabled to set up one or more predefined wager amounts via the gaming device, the internet, a player tracking device, a service window, a kiosk, or any other suitable manner.

In one embodiment, each of the different wager amounts is associated with an input device, such as a button. In one embodiment, the inputs or buttons associated with the different wager amounts are located on a separate panel. In such embodiments, the player selects one of the different wager amounts (via one of the inputs or buttons) to cause a play of the game. After the player selects one of the wager amounts, the gaming device performs the type or types of symbol evaluation associated with the selected wager amount in the play of the game. It should be appreciated that the gaming device disclosed herein enables a gaming device designer or manufacturer to associated any suitable type of symbol evaluation with any of the different wager amounts.

Referring now generally to FIGS. 4A, 4B, 4C, 4D, 4E, 4F, 4G, and 4H, one embodiment of the present disclosure is illustrated wherein, if the player's wager is in a first range of wager values, the gaming device provides the payline evaluation. If the player's wager is in a second range of wager values, the gaming device provides the payline evaluation and a ways to win evaluation. If the player's wager is in a third range of wager values, the gaming device provides the payline evaluation, the ways to win evaluation, and a bonus trigger evaluation.

In another embodiment, rather than providing the payline evaluation as the first type of symbol evaluation and the ways to win evaluation as the second type of symbol evaluation, the first type of symbol evaluation is a ways to win evaluation and the second type of symbol evaluation is a payline evaluation. In an alternative embodiment, the player selects the order in which the different symbol evaluations occur.

Figure 4A:
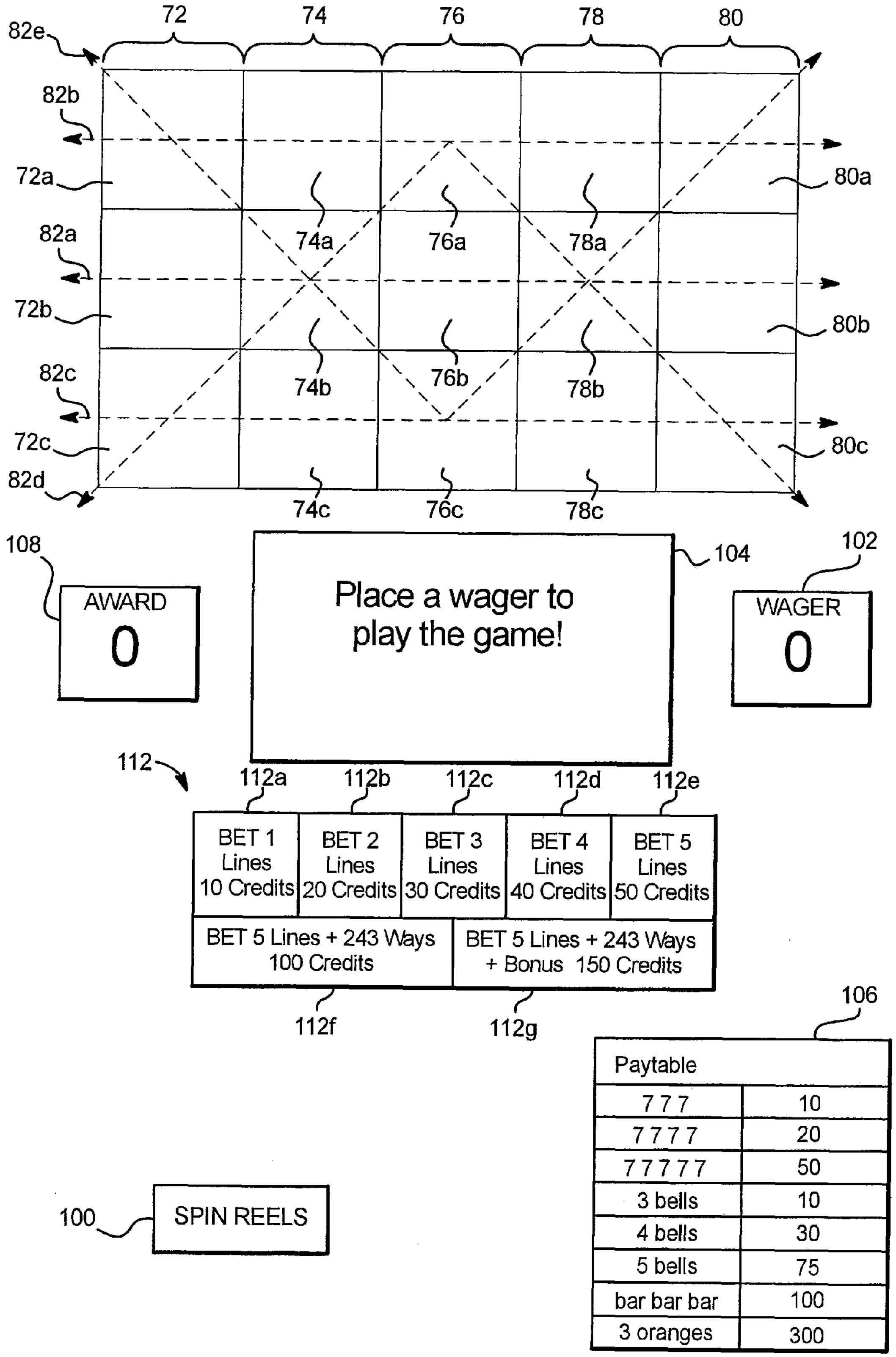
FIGS. 4A, 4B, 4C, 4D, 4E, 4F, 4G, and 4H are enlarged front plan views of one example embodiment of the gaming device disclosed herein.

Referring now to FIG. 4A, the gaming device includes five reels 72, 74, 76, 78, and 80, each of the reels associated with three symbol positions. The gaming device includes 5 available paylines 82*a*, 82*b*, 82*c*, 82*d*, 82*e*, which are shown in phantom lines for illustration purposes. The gaming device further includes a "spin reels" button 100, an award meter 108, and a wager meter 102. The award meter 108 and the wager meter 102 are blank, indicating that the player has not yet placed a wager or received an award in the game. The gaming device displays a paytable 106, which lists the winning symbol combinations in the game and the award associated with each winning symbol combination.

As seen in FIG. 4A, the gaming device displays a message in message box 104 prompting the player to place a wager to begin the game. The gaming device enables the player to place a wager by pressing one of a plurality of wager buttons 112. Each of the wager buttons 112 corresponds to a different wager amount.

Inputs or buttons 112*a*, 112*b*, 112*c*, 112*d*, and 112*e* represent the first range of wager values (i.e., the wager amounts required to wager on 1, 2, 3, 4, or all 5 of the paylines). For example, if the player wagers 10 credits by pressing button 112*a*, the player wagers on 1 of the paylines. If the player wagers 50 credits by pressing button 112*e*, the player wagers on all 5 paylines. For each wagered on payline, the gaming device evaluates the symbols generated on that payline to determine whether any winning symbol combinations are indicated.

Inputs or buttons 112*f* and 112*g* represent the second and third ranges of wager amounts, respectively. That is, the player can wager on all of the paylines and all of the ways to win by pressing button 112*f* (i.e., placing a wager of 100 credits). Alternatively, the player can wager on all of the paylines, all of the ways to win, and a chance to win a bonus event wager by pressing button 112*g* (i.e., placing a wager of 150 credits).

Figure 4B:
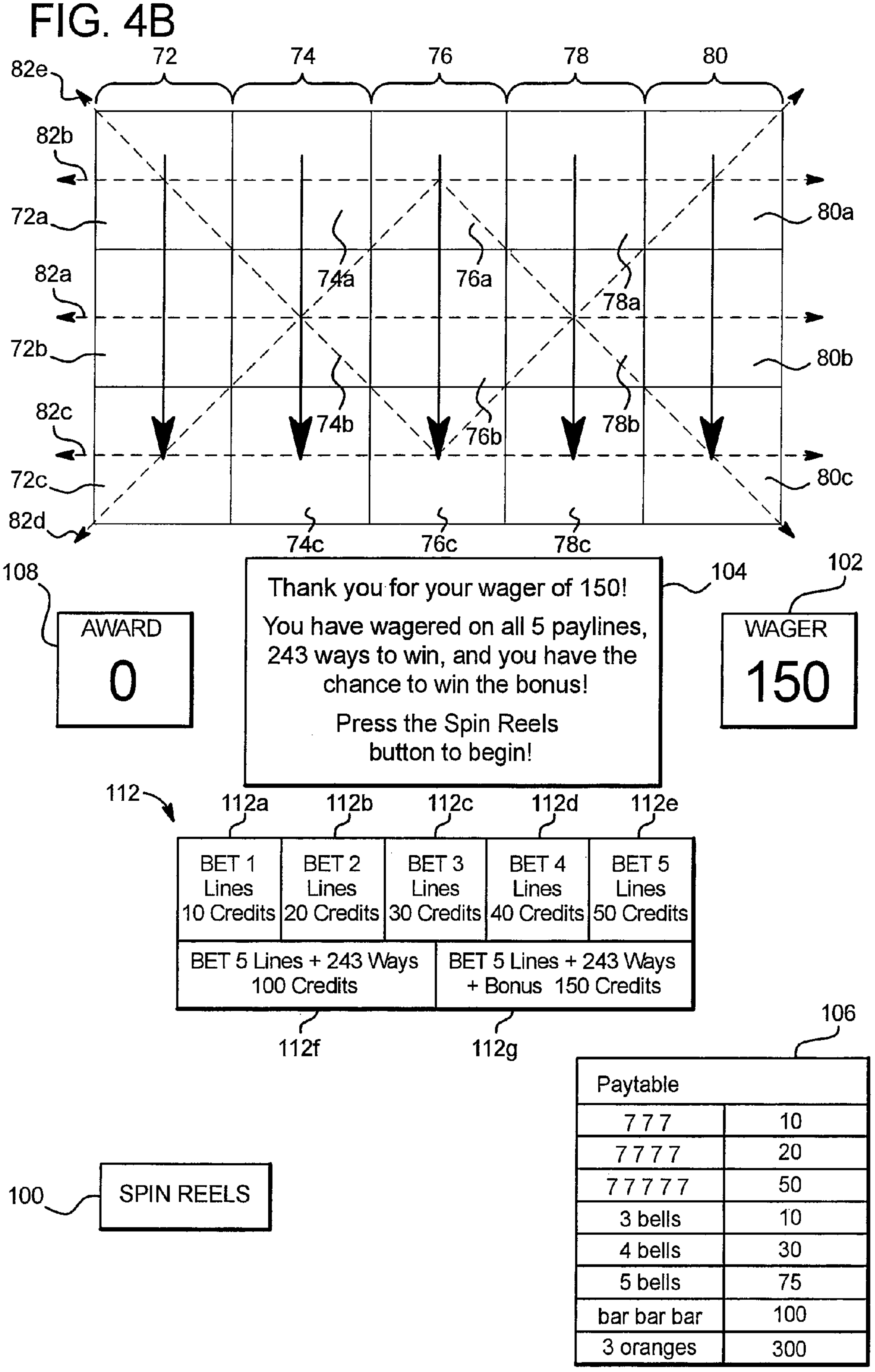

In FIG. 4B, the player has placed a wager of 150 credits, as indicated in the wager meter 102. Thus, the player has wagered on all of the paylines, all of the ways to win, and a chance to win a bonus event. The award meter 108 is blank, indicating that the player has not yet received an award. The gaming device displays a message in message box 104 prompting the players to press the "spin reels" button 100 to begin play of the game. Accordingly, as illustrated in FIG. 4B, the player presses the "spin reels" button 100, and the reels spin.

Figure 4C:
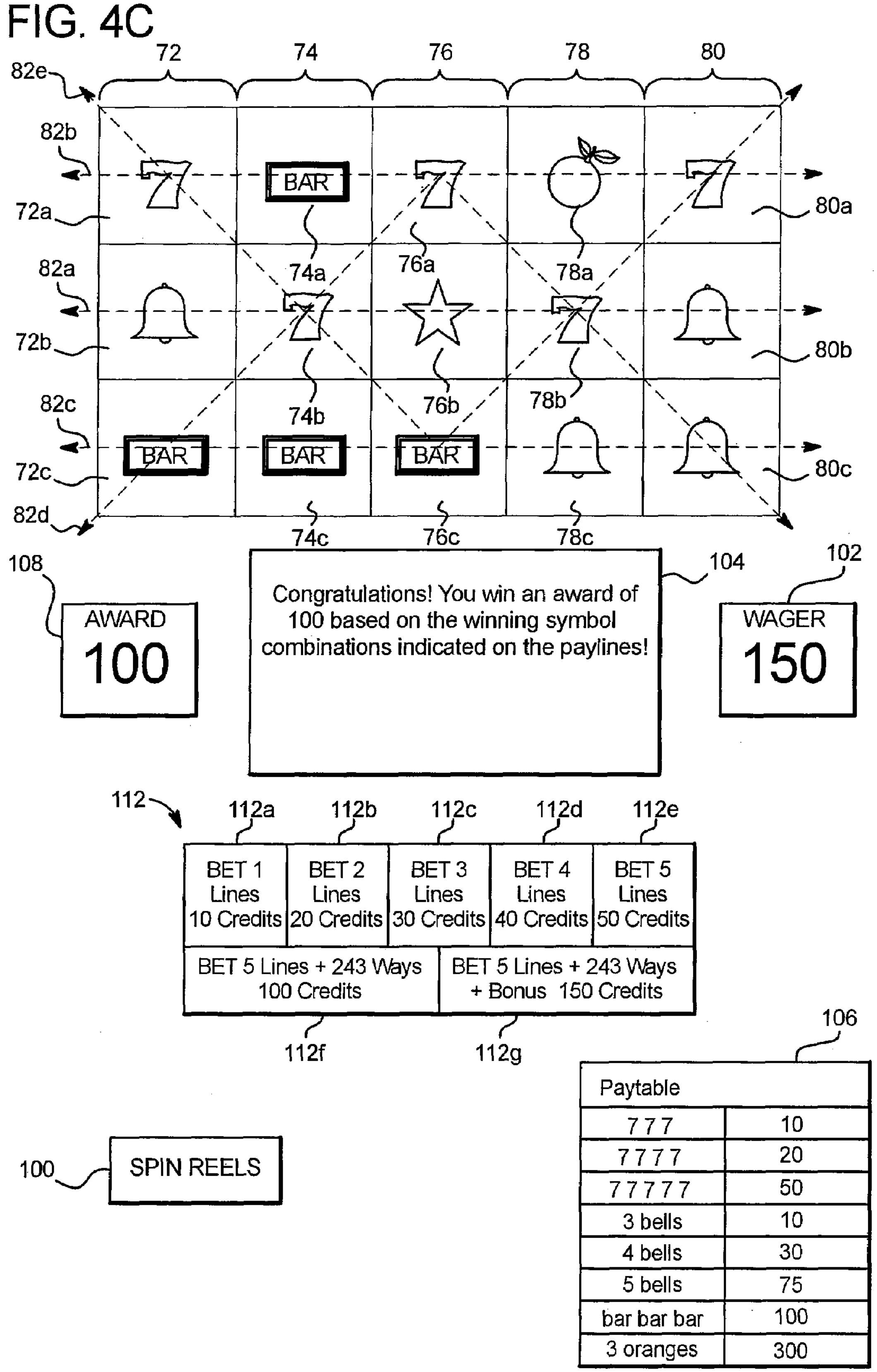

As seen in FIG. 4C, when the reels have stopped spinning, a plurality of symbols are indicated on the reels. The gaming device evaluates the symbols generated on each of the wagered on paylines to determine whether any winning combination of symbols are indicated on the paylines. For illustration purposes, the paylines 82*a*, 82*b*, 82*c*, 82*d*, 82*e* are shown in phantom lines.

As seen in FIG. 4C, payline 82*a* passes through symbol positions 72*b*, 72*b*, 74*b*, 76*b*, 78*b*, and 80*b*, and therefore, indicates the following symbols: bell, seven, star, seven, and bell. According to paytable 106, the symbols indicated on payline 82*a* do not include a winning symbol combination. Therefore, the player receives no award in connection with payline 82*a*.

Payline 82*b* passes through symbol positions 72*a*, 74*a*, 76*a*, 78*a*, and 80*a*, and therefore, indicates the following symbols: seven, bar, seven, orange, and seven. According to paytable 106, the symbols indicated on payline 82*b* do not include a winning symbol combination. Therefore, the player receives no award in connection with payline 82*b*.

Payline 82*c* passes through symbol positions 72*c*, 74*c*, 76*c*, 78*c*, and 80*c*, and therefore, indicates the following symbols: bar, bar, bar, bell, and bell. According to paytable 106, the symbols indicated on payline 82*c* include a winning symbol combination. The three bar symbols correspond to an award of 100, as indicated by the paytable 106.

Payline 82*d* passes symbol positions 72*c*, 74*b*, 76*a*, 78*b*, and 80*c*, and therefore, indicates the following symbols: bar, bell, bell, bell, and cherry. Payline 82*d* does not include a winning symbol combination. Therefore, the player receives no award in connection with payline 82*d*.

Payline 82_e_ passes through symbol positions 72_a_, 74_b_, 76_c_, 78_b_, and 80_a_, and therefore, indicates the following symbols: seven, seven, bar, seven, and seven. According to paytable 106, the symbols indicated on payline 82_b_ do not include a winning symbol combination. The player receives no award in connection with payline 82_e_.

As indicated by the award meter 108 in FIG. 4C, the player wins a total award of 100 for the winning symbol combination indicated on payline 82_c_. The gaming device displays a message in message box 104 congratulating the player for winning the award of 100.

Figure 4D:
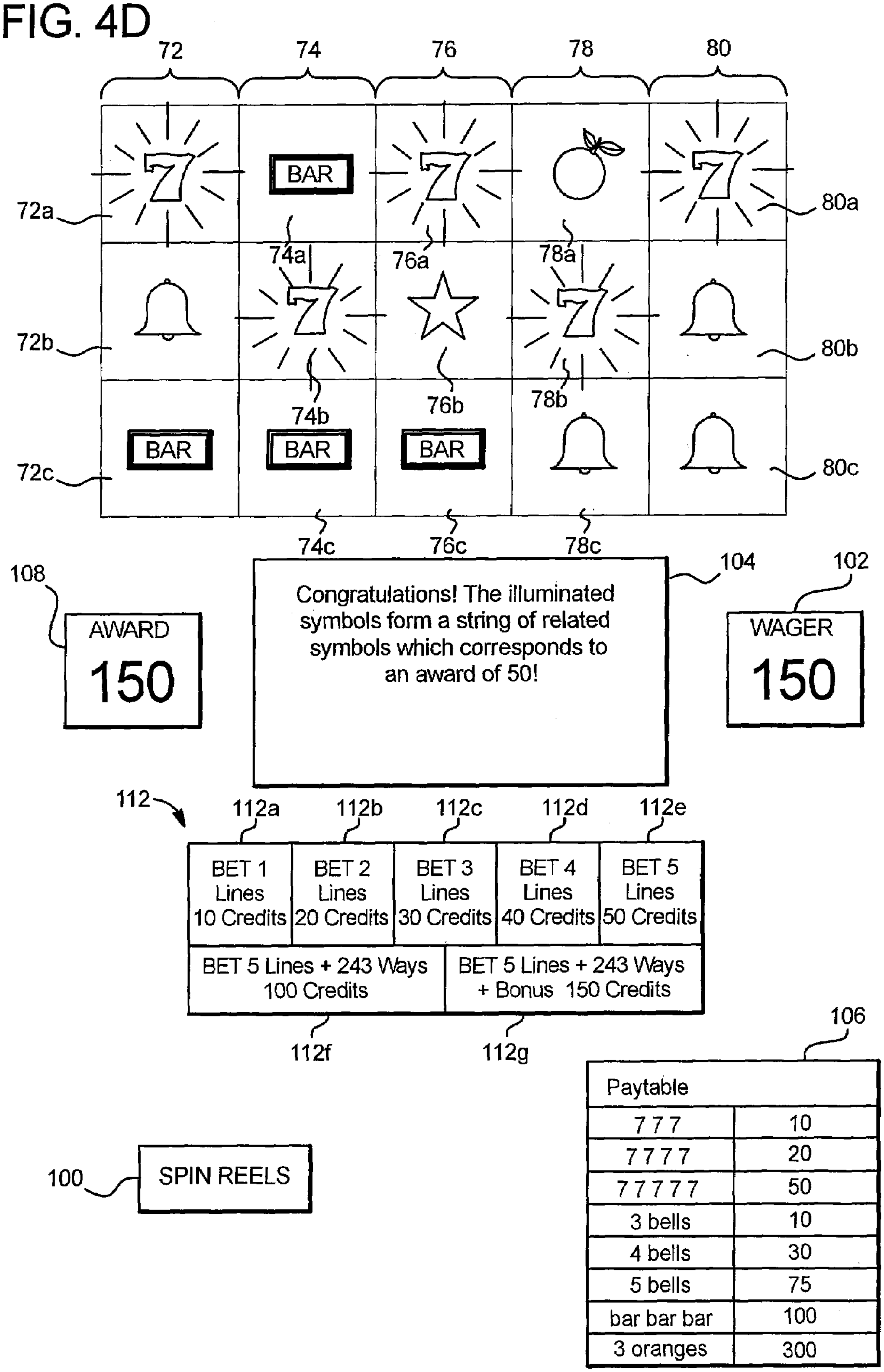

Referring now to FIG. 4D, all of the symbol positions are active symbol positions for the ways to win evaluation because the player wagered on all of the ways to win. It should be appreciated that, since the gaming device includes five reels with three symbols generated in active symbol positions on each reel, there are 243 total ways to win (i.e., 3 symbols on the first reel×3 symbols on the second reel×3 symbols on the third reel×3 symbols on the fourth reel×3 symbols on the fifth reel).

As seen in FIG. 4D, symbol positions 72_a_, 74_b_, 76_a_, 78_b_, and 80_a_ are illuminated, indicating that the gaming device is evaluating the symbols displayed in these active symbol positions. The symbols displayed in active symbol positions 72_a_, 74_b_, 76_a_, 78_b_, and 80_a_ form a string of related symbols. To form this string of related symbols, the gaming device determines whether any of the symbols displayed in active symbol positions associated with the first reel are related to any of the symbols displayed in active symbol positions associated with the second reel.

As seen in FIG. 4D, the seven symbol displayed in active symbol position 72_a_ and the seven symbol displayed in active symbol position 74_b_ are related because the two seven symbols form part of a winning symbol combination according to the paytable 106. Thus, the gaming device classifies the seven symbols displayed in active symbol positions 72_a_ and 74_b_ as related symbols and forms a string of related symbols.

After classifying the string of related seven symbols displayed in active symbol positions 72_a_ and 74_b_, the gaming device determines whether any symbols on the next adjacent reel 76 need to be added to the string of related seven symbols. The seven symbol displayed in active symbol position 76_a_ is related to the two seven symbols in the string of related symbols. Therefore, the gaming device adds the seven symbol displayed in active symbol position 76_b_ to the string of related symbols.

After classifying the string of related seven symbols displayed in active symbol positions 72_a_, 74_b_, and 76_a_, the gaming device determines whether any symbols on the next adjacent reel 78 need to be added to the string of related seven symbols. The seven symbol displayed in active symbol position 78_b_ is related to the three seven symbols in the string of related symbols. Therefore, the gaming device adds the seven symbol displayed in active symbol position 78_b_ to the string of related symbols.

After classifying the string of related seven symbols displayed in active symbol positions 72_a_, 74_b_, 76_a_, and 78_b_, the gaming device determines whether any symbols on the next adjacent reel 80 need to be added to the string of related seven symbols. The seven symbol displayed in active symbol position 80_a_ is related to the four seven symbols in the string of related symbols. Therefore, the gaming device adds the seven symbol displayed in active symbol position 80_a_ to the string of related symbols.

There are no other adjacent reels to evaluate. Accordingly, the gaming device marks the string of related seven symbols in active symbol positions 72_a_, 74_b_, 76_a_, 78_b_, and 80_a_ as complete. The gaming device compares the combination of five seven symbols to the paytable 106.

According to paytable 106, the completed string of five related seven symbols corresponds to a winning symbol combination associated with an award of 50. Thus, the gaming device displays a message in message box 104 informing the player that the player wins an award of 50. As indicated by the award meter 108, the award of 50 is added to the player's previous award of 100, and the player has a total award of 150.

It should be appreciated that, in certain embodiments, if the same set of symbols may be combined for two or more winning symbol combinations, the gaming device will provide the player an award for one of the winning symbol combinations and not each of the winning symbol combinations that the set of symbols may form. For example, if five displayed seven symbols form a winning symbol combination, the gaming device will provide the player an award for the five displayed seven symbols, but the gaming device will not provide the player an award for a symbol combination of four displayed seven symbols or a symbol combination of three displayed seven symbols, even though such four and three seven symbol combinations may otherwise be winning symbol combinations associated with an award.

Figure 4E:
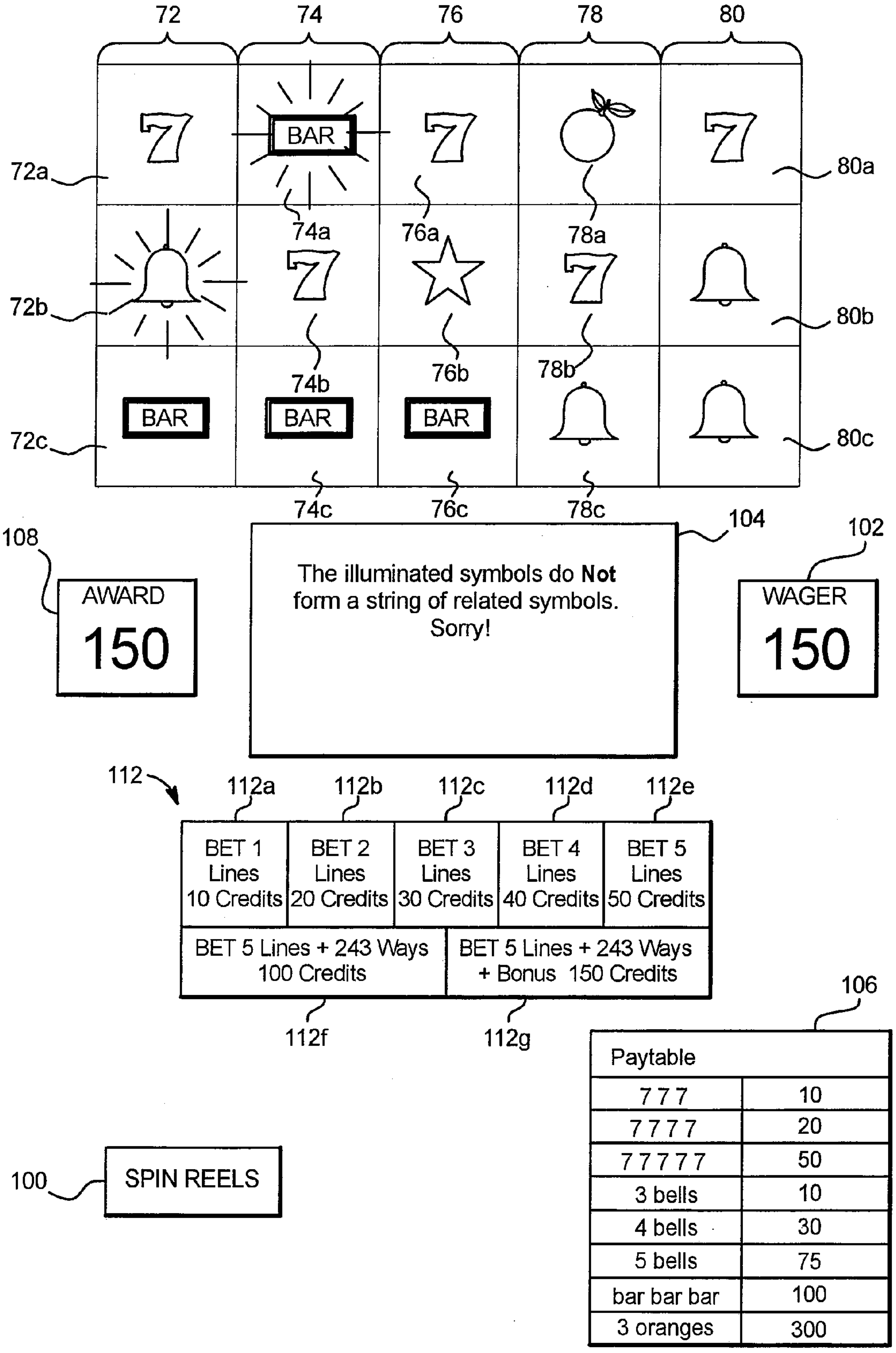

Referring now to FIG. 4E, active symbol positions 72_b_ and 74_a_ are illuminated, indicating that the gaming device is evaluating the symbols displayed in these active symbol positions. The symbols displayed in active symbol positions 72_b_ and 74_a_ do not form a string of related symbols. The bell symbol displayed in active symbol position 72_b_ and the bar symbol displayed in active symbol position 74_a_ are not related. Accordingly, the player receives no additional award, and the award meter 108 indicates that the player's total award is still 160.

Figure 4F:
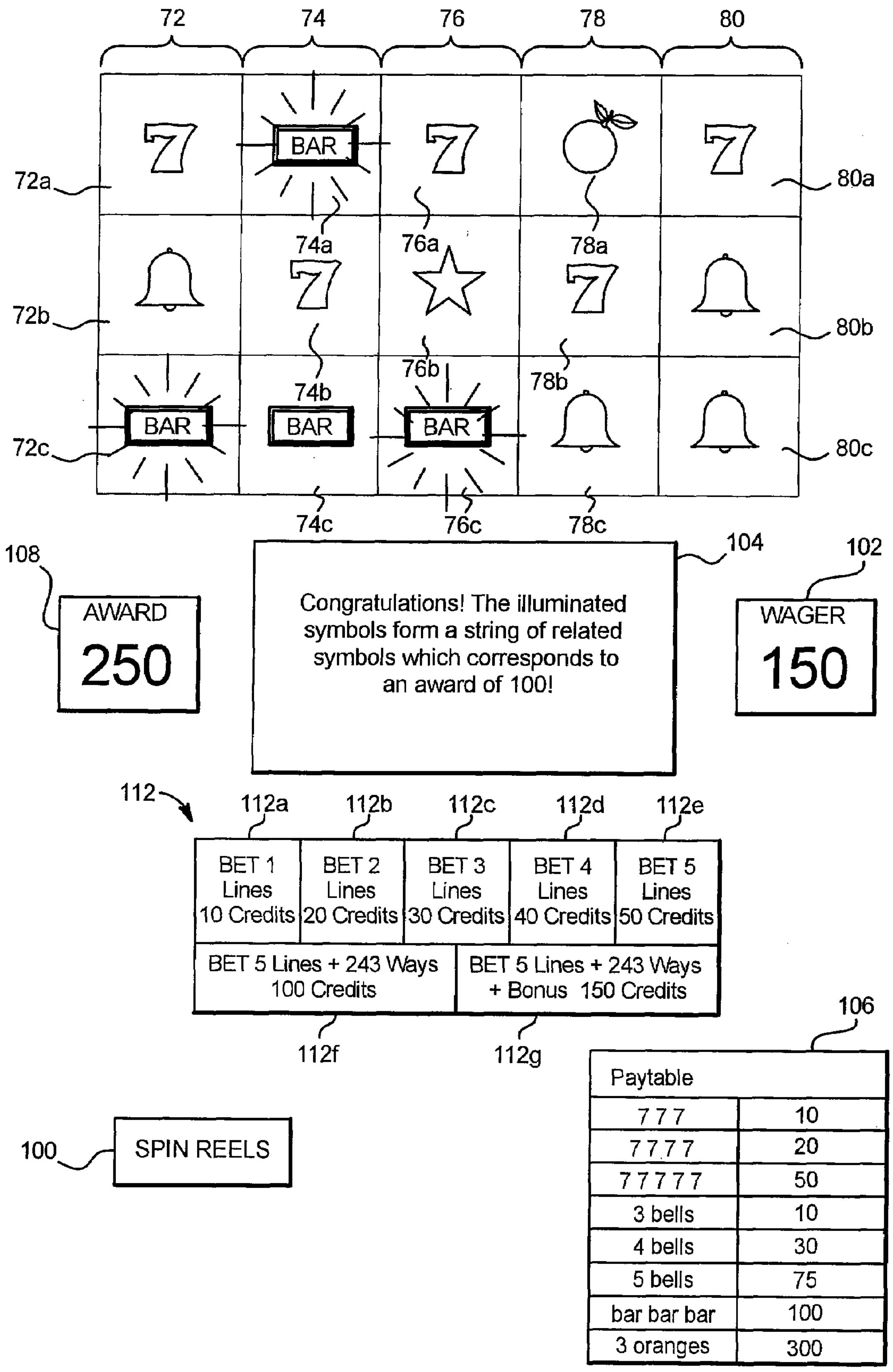

Referring now to FIG. 4F, active symbol positions 72_c_, 74_a_, and 76_c_ are illuminated, indicating that the gaming device is evaluating the symbols displayed in these active symbol positions. The symbols displayed in active symbol positions 72_c_, 74_a_, and 76_c_ form a string of related symbols. The bar symbol displayed in active symbol position 72_c_ and the bar symbol displayed in active symbol position 74_a_ are related because the two bar symbols form part of a winning symbol combination according to the paytable 106. Thus, the gaming device classifies the bar symbols displayed in active symbol positions 72_c_ and 74_a_ as related symbols and forms a string of related symbols.

After classifying the string of related bar symbols displayed in active symbol positions 72_c_ and 74_a_, the gaming device determines whether any symbols on the next adjacent reel 76 need to be added to the string of related bar symbols. The bar symbol displayed in active symbol position 76_c_ is related to the two bar symbols in the string of related symbols. Therefore, the gaming device adds the bar symbol displayed in active symbol position 76_c_ to the string of related symbols.

After classifying the string of related bar symbols displayed in active symbol positions 72_c_, 74_a_, and 76_c_, the gaming device determines whether any symbols on the next adjacent reel 78 need to be added to the string of related bar symbols. None of the symbols on the next adjacent reel 80 are related to the string of bar symbols. Thus, the gaming device marks the string of related bar symbols in active symbol positions 72_c_, 74_a_, and 76_c_ as complete. The gaming device compares the combination of three bar symbols to the paytable 106.

According to paytable 106, the completed string of three bar symbols corresponds to a winning symbol combination associated with an award of 100. Thus, the gaming device displays a message in message box 104 informing the player that the player wins an award of 100. As indicated by the award meter 108, the award of 100 is added to the player's previous award of 150, and the player has a total award of 250.

Figure 4G:
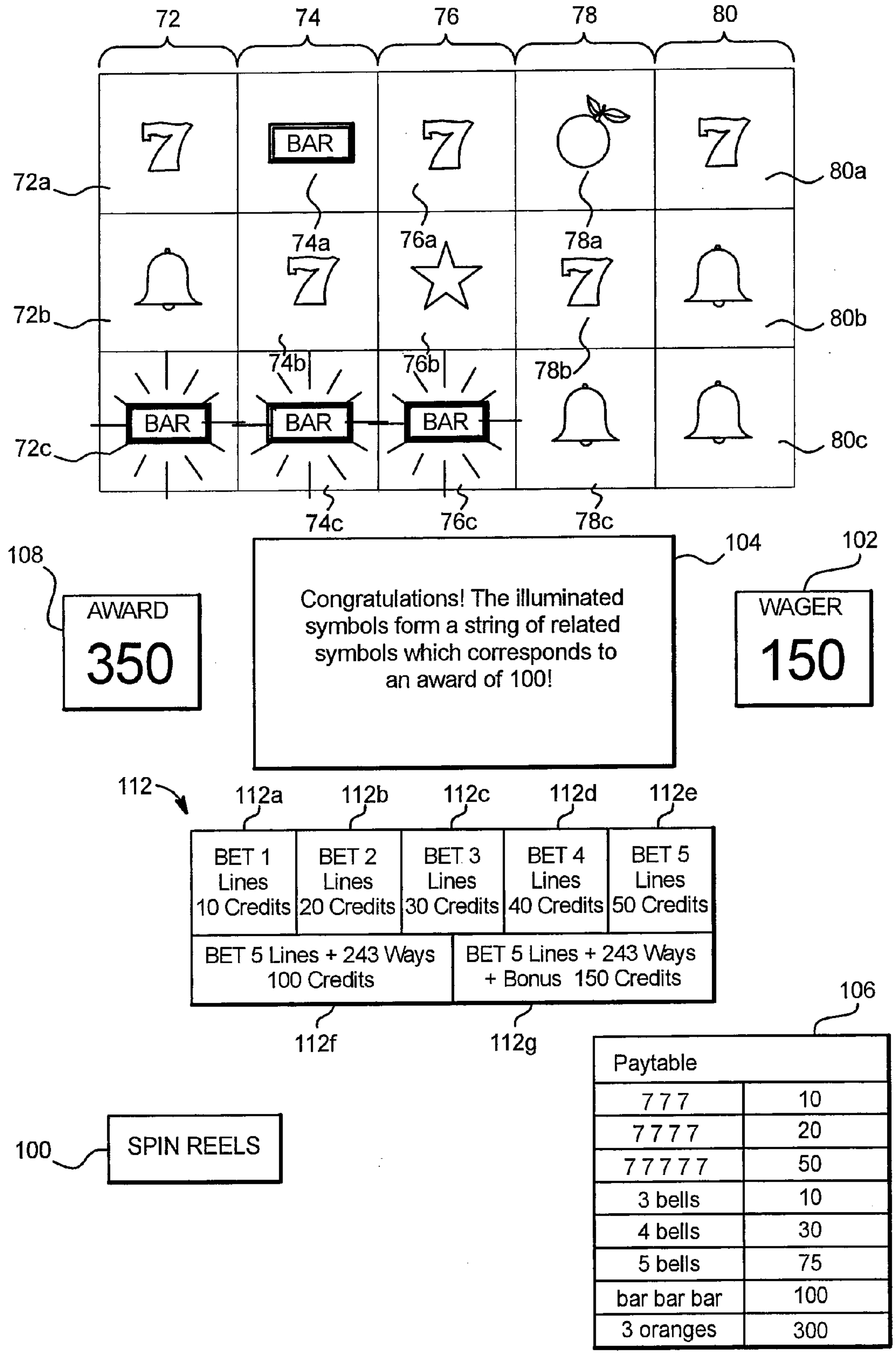

Referring now to FIG. 4G, active symbol positions 72*c*, 74*c*, and 76*c* are illuminated, indicating that the gaming device is evaluating the symbols displayed in these active symbol positions. The symbols displayed in active symbol positions 72*c*, 74*c*, and 76*c* form a string of related symbols. The bar symbol displayed in active symbol position 72*c* and the bar symbol displayed in active symbol position 74*c* are related because the two bar symbols form part of a winning symbol combination according to the paytable 106. Thus, the gaming device classifies the bar symbols displayed in active symbol positions 72*c* and 74*c* as related symbols and forms a string of related symbols.

The bar symbol displayed in active symbol position 76*c* is related to the two bar symbols in the string of related symbols. Therefore, the gaming device adds the bar symbol displayed in active symbol position 76*c* to the string of related symbols.

After classifying the string of related bar symbols displayed in active symbol positions 72*c*, 74*c*, and 76*c*, the gaming device determines whether any symbols on the next adjacent reel 78 need to be added to the string of related bar symbols. None of the symbols on the next adjacent reel 80 are related to the string of bar symbols. Thus, the gaming device marks the string of related bar symbols in active symbol positions 72*c*, 74*c*, and 76*c* as complete. According to paytable 106, the completed string of three bar symbols corresponds to a winning symbol combination associated with an award of 100. As seen in FIG. 4G, the gaming device displays a message in message box 104 informing the player that the player wins an award of 100. As indicated by the award meter 108, the award of 100 is added to the player's previous award of 250, and the player has a total award of 350.

In one alternative embodiment, the gaming device includes a trumping feature where a certain type or certain types of symbol evaluation trump other types of symbol evaluation provided in the game. In one example embodiment, if the gaming device first applies a payline evaluation to analyze the generated symbols and then applies a ways to win evaluation to analyze the same generated symbols, the payline evaluation trumps the ways to win evaluation. For instance, if the payline evaluation trumped the ways to win evaluation in the example of FIGS. 4A to 4G, the completed string of related symbols including the three bar symbols in symbol positions 72*c*, 74*c*, and 76*c* would not result in an award, even though that string of related symbols corresponds to a winning symbol combination according to the paytable. The player previously received an award for that symbol combination because the three bar symbols in symbol positions 72*c*, 74*c*, and 76*c* were generated along one of the wagered paylines (Payline 82*c*, as seen in FIG. 4C).

On the other hand, the gaming device would provide an award for the three bar symbols forming the string of related symbols in symbol positions 72*c*, 74*a*, and 76*c*. In this case, there is no available payline passing through these symbol positions. In such an embodiment, the gaming device provides awards for strings of related symbols that correspond to winning symbol combinations and that do not overlap with a winning symbol combination generated along one of the wagered on paylines.

Figure 4H:
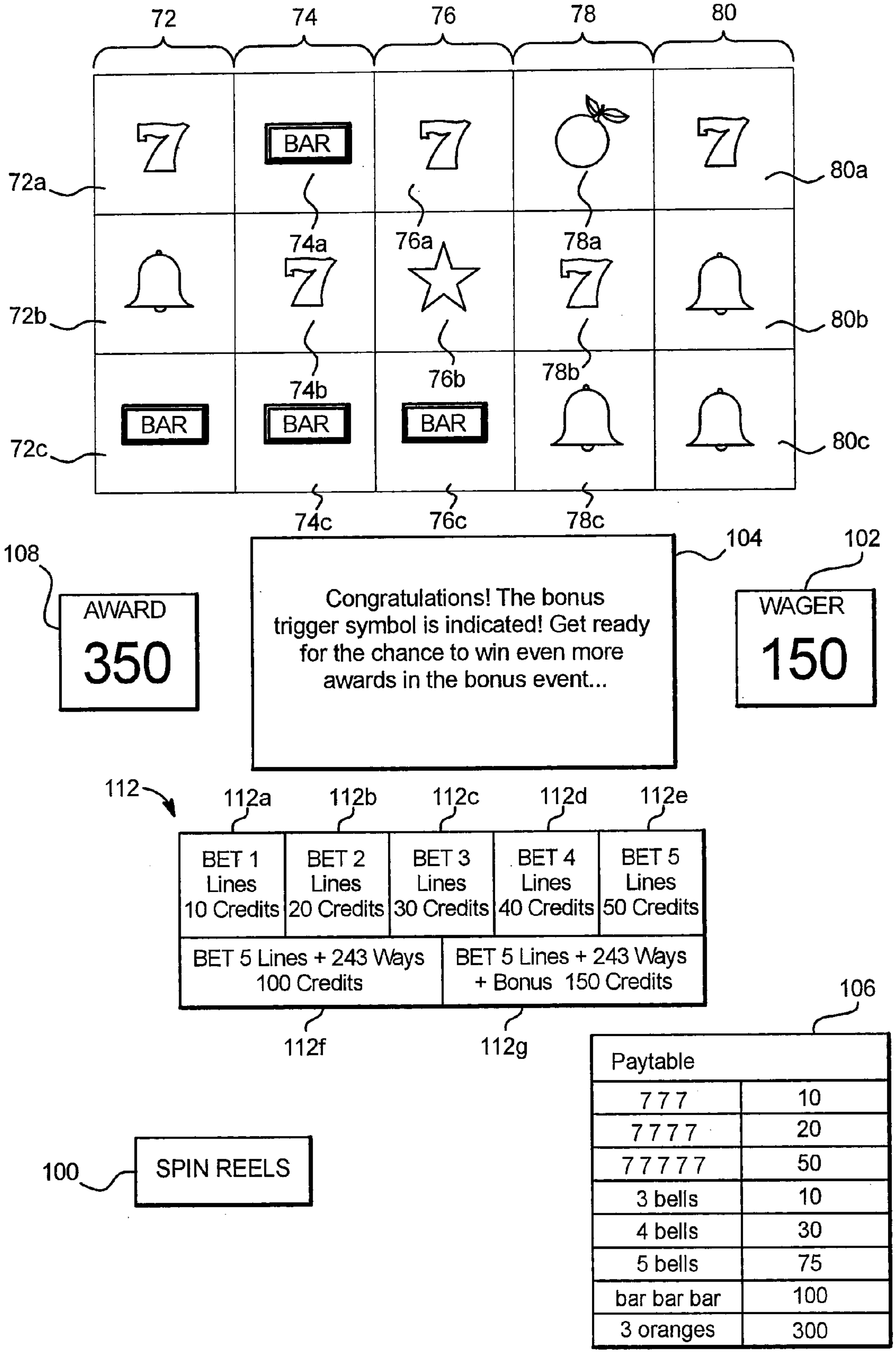

In FIG. 4H, the gaming device provides the bonus trigger evaluation to determine whether a bonus trigger is indicated on the reels. In one embodiment, the bonus trigger is a designated symbol or a designated combination of symbols indicated on the reels. In one such embodiment, the bonus trigger is a designated symbol or a designated combination of symbols indicated on a designated payline.

In this example embodiment, the bonus trigger is a star symbol which can be indicated anywhere on the reels. Thus, the gaming device analyzes the symbols to determine whether the star symbol in indicated anywhere on the reels. As seen in FIG. 4H, the star symbol is indicated on the reels in symbol position 76*b*. Accordingly, the gaming device displays a message in message box 104 congratulating the player and informing the player that the player will now participate in the bonus event.

In one embodiment, the gaming device provides the player with a number free spins of the reels, such as 10 free spins. For each free spin, the gaming device activates the reels to generate a plurality of symbols. In one such embodiment, the free spins are on a separate set of reels or on a side display. In one such embodiment, the gaming device provides the free spins to the player after the primary game. In one embodiment, the types of symbol evaluation provided in the free spins are based on wager placed by the player to play the primary game. In one embodiment, the gaming device provides the same types of symbol evaluation in the free spins that the player had going into the free spins round (i.e., same evaluations that were provided to player in the primary game). Alternatively, the types of symbol evaluations in the free spins are different than those in primary game.

In one embodiment, if the player has qualified for the bonus trigger evaluation, the gaming device provides the player with a number free spins of the reels. For each free spin, the gaming device activates the reels to generate a plurality of symbols. The gaming device provides the player with one additional free spin for each free spins that does not trigger the bonus event.

Referring now generally to FIGS. 5A, 5B, 5C, 5D, 5E, 5F, and 5G, another embodiment of the gaming device of the present disclosure is illustrated wherein, if the player's wager is in a first range of wager values, the gaming device provides the payline evaluation. If the player's wager is in a second range of wager values, the gaming device provides the payline evaluation and the ways to win evaluation. If the player's wager is in a third range of wager values, the gaming device provides the payline evaluation, the ways to win evaluation, and the bonus trigger evaluation.

Figure 5A:
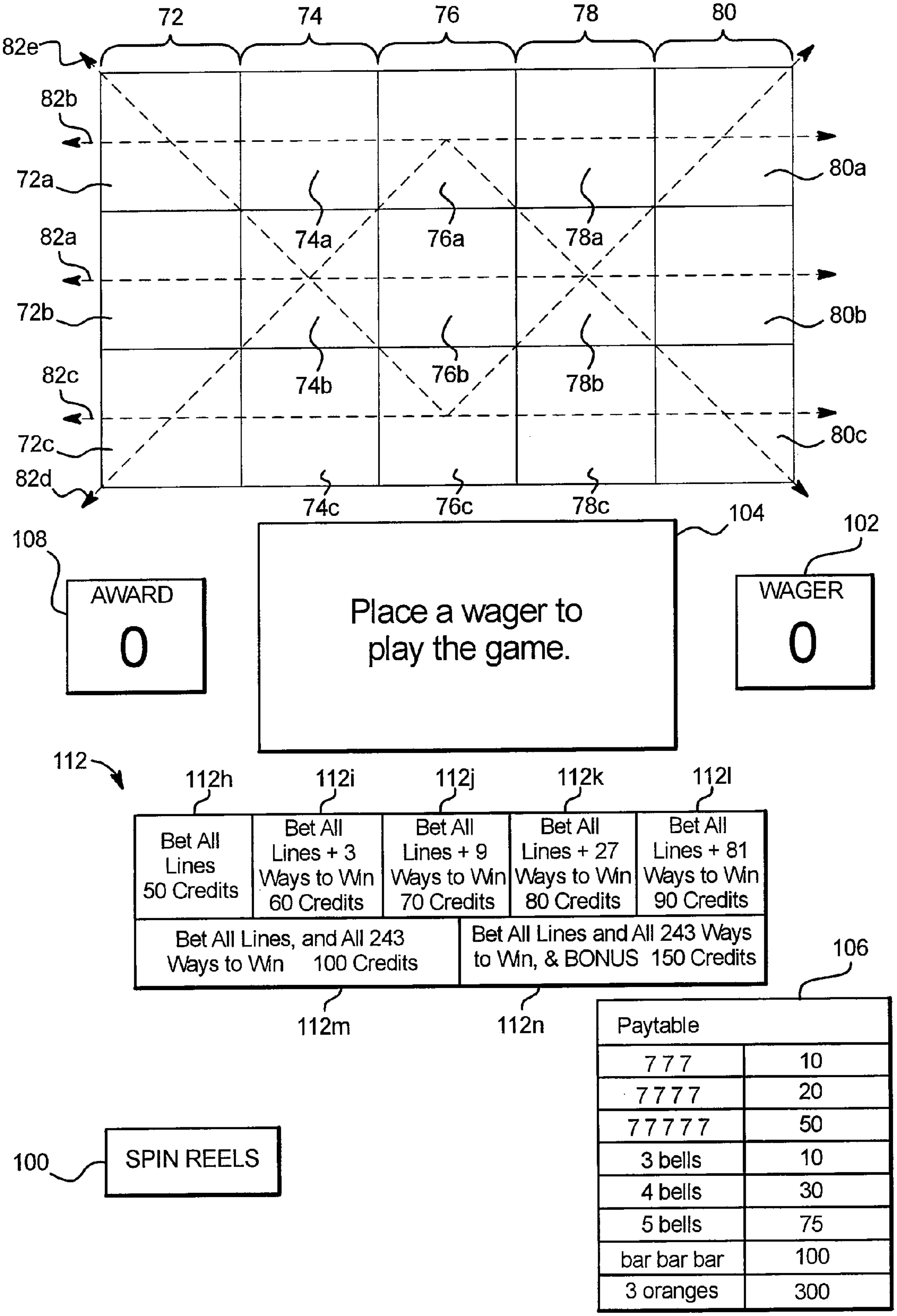
FIGS. 5A, 5B, 5C, 5D, 5E, 5F, and 5G are enlarged front plan views of one example embodiment of the gaming device disclosed herein.

As seen in FIG. 5A, the gaming device includes five reels 72, 74, 76, 78, and 80 each of the reels associated with three symbol positions. The award meter 108 and the wager meter 102 are blank, indicating that the player has not yet received an award in the game or placed a wager in the game. The gaming device displays a message in message box 104 prompting the player to make a wager to begin playing the game.

The gaming device displays a plurality of buttons 112, each of the buttons corresponding to a different wager amount. Button 112*a* corresponds to the first range of wager amounts. If the player presses button 112*a* (i.e., wagers 50 credits), the player wagers on all of the paylines 82*a*, 82*b*, 82*c*, 82*d*, 82*e*.

Inputs or buttons 112*i* to 112*m* correspond to the second range of wager amounts. If the player presses button 112*i* (i.e., wagers 60 credits), the player wagers on all of the paylines and 3 ways to win. If the player presses button 112*m* (i.e., wagers 100 credits), the player wagers on all of the paylines and 243 ways to win. Button 112*n* corresponds to the third range of wager amounts. If the player presses button 112*n* (i.e., wagers 150 credits), the player wagers on all of the paylines, 243 ways to win, and a chance to win a bonus event.

Figure 5B:
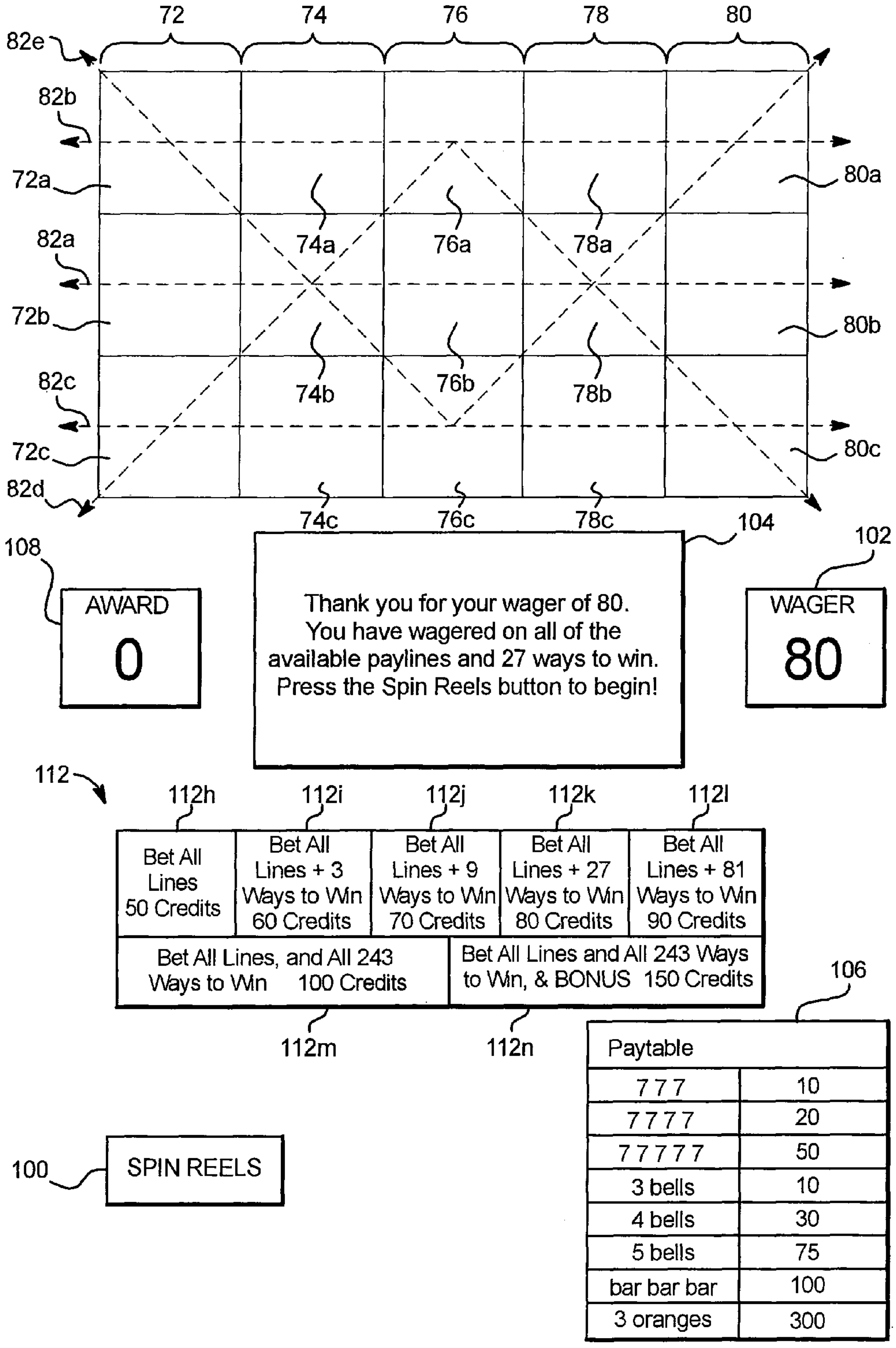

As illustrated in FIG. 5B, the player has placed a wager of 80 credits. Thus, the player's wager covers all of the paylines

82*a*, 82*b*, 82*c*, 82*d*, 82*e* and 27 ways to win. The gaming device displays a message prompting the player to press the spin the reels button 100, as seen in message box 104.

Figure 5C:
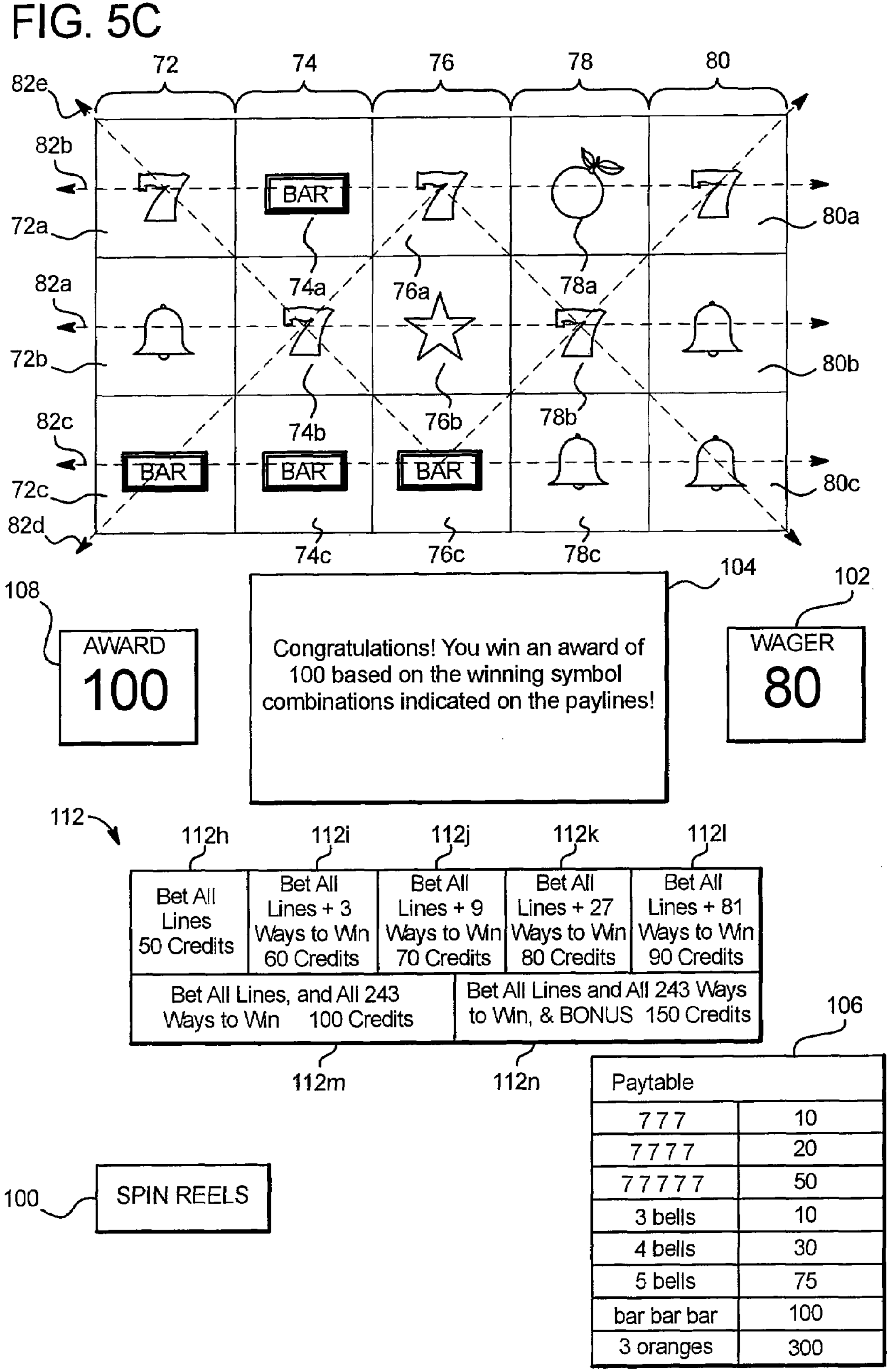

As illustrated in FIG. 5C, the gaming device performs the payline evaluation to determine whether the symbols generated along any wagered on paylines include any winning symbol combinations. The player wins an award of 100 based on the winning symbol combinations determined in the payline evaluation. Accordingly, the award meter 102 shows the number 100 to reflect the player's award. The gaming device displays a message in message box 104 congratulating the player for winning an award of 100.

Figure 5D:
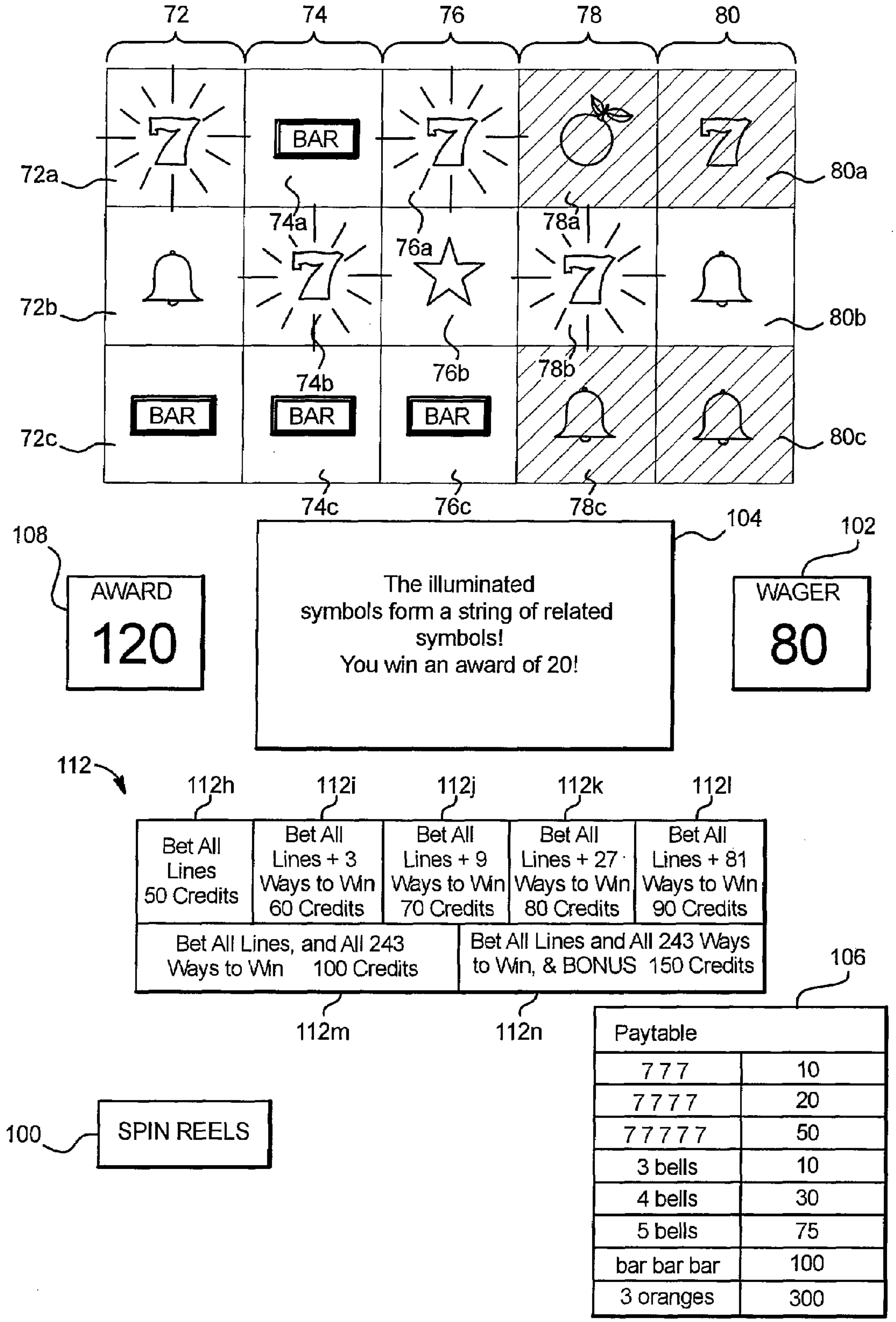

In FIG. 5D, the gaming device provides the ways to win evaluation to determine any award(s) to provide to the player based on the generated symbols. In one embodiment, the gaming device identifies a certain number of the symbol positions as active symbol positions for the ways to win evaluation based on the number of wagered on ways to win.

As discussed above, a five reel gaming device with three symbols generated on each reel includes 243 possible ways to win (i.e., 3 symbols on the first reel×3 symbols on the second reel×3 symbols on the third reel×3 symbols on fourth reel×three symbols on fifth reel). In this example, the player has wagered on three ways to win. Therefore, the gaming device identifies 3 symbol positions on three of the reels, and 1 symbol on each of the other reels as active symbol positions (i.e., 3×3×3×1×1=27 ways to win).

In another embodiment, the gaming device enables the player to select which symbol positions are identified as active for the ways to win evaluation. That is, the gaming device enables a player to wager on and thus activate symbol positions. In one embodiment, if based on the player's wager, a reel is activated, then each of the symbol positions of that reel will be activated and each of the active symbol positions will be part of one or more of the ways to win. In one embodiment, if based on the player's wager, a reel is not activated, a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the number of active symbol positions and the number of possible ways to win.

In this example, the gaming device provides the player twenty-seven ways to win (i.e., 3 symbols on the first reel×3 symbols on the second reel×3 symbols on the third reel×1 symbol on the fourth reel×1 symbol on the fifth reel) for the players wager of 80 credits. As seen in FIG. 5D, the gaming device activates each of the three symbol positions on a first reel 72, each of the three symbol positions on a second reel 74, and each of the three symbol positions on a third reel 76, wherein one default symbol position is activated on each of the remaining two reels 78 and 80.

In different embodiments, (1) no symbols are displayed in any of the non-active symbol positions, or (2) any symbols generated in any non-active symbol positions may be displayed to the player but suitably shaded or otherwise designated as non-active. In this example, symbols are generated and displayed in the non-active symbol positions, but these symbols are shaded to indicate to the player that these symbol positions are not active symbol positions for the ways to win evaluation.

In FIG. 5D, the gaming device illuminates active symbol positions 72*a*, 74*b*, 76*a*, and 78*b*, indicating that the gaming device is evaluating the symbols displayed in these active symbol positions to determine whether they form a string of related symbols. The seven symbol displayed in active symbol position 72*a* and the seven symbol displayed in active symbol position 74*b* are related because the two seven symbols form part of a winning symbol combination according to the paytable 106. Thus, the gaming device classifies the seven symbols displayed in active symbol positions 72*a* and 74*b* as related symbols and forms a string of related symbols.

After classifying the string of related seven symbols displayed in active symbol positions 72*a* and 74*b*, the gaming device determines whether any symbols on the next adjacent reel 76 need to be added to the string of related seven symbols. The seven symbol displayed in active symbol position 76*a* is related to the two seven symbols in the string of related symbols. Therefore, the gaming device adds the seven symbol displayed in active symbol position 76*b* to the string of related symbols.

After classifying the string of related seven symbols displayed in active symbol positions 72*a*, 74*b*, and 76*a*, the gaming device determines whether any symbols on the next adjacent reel 78 need to be added to the string of related seven symbols. The seven symbol displayed in active symbol position 78*b* is related to the three seven symbols in the string of related symbols. Therefore, the gaming device adds the seven symbol displayed in active symbol position 78*b* to the string of related symbols.

After classifying the string of related seven symbols displayed in active symbol positions 72*a*, 74*b*, 76*a*, and 78*b*, the gaming device determines whether any symbols on the next adjacent reel 80 need to be added to the string of related seven symbols.

There are no related symbols in active symbol positions on reel 80 to evaluate. Accordingly, the gaming device marks the string of related seven symbols in symbol positions 72*a*, 74*b*, 76*a*, and 78*b* as complete. The gaming device compares the combination of four seven symbols to the paytable 106. As seen in FIG. 5D, the gaming device displays a message in the message box 104 informing the player the four seven symbols correspond to an award of 20. The additional award of 20 is added to the players previous score of 100 for a total award of 120, as indicated by the award meter 108.

It should be appreciated that although the seven symbol displayed in symbol position 80*a* is related to the string of related symbols and is in an adjacent reel, symbol position 80*a* was not active for the ways to win evaluation. Therefore, the gaming device does not add the seven symbol displayed in symbol position 80*a* to the string of related symbols.

Figure 5E:
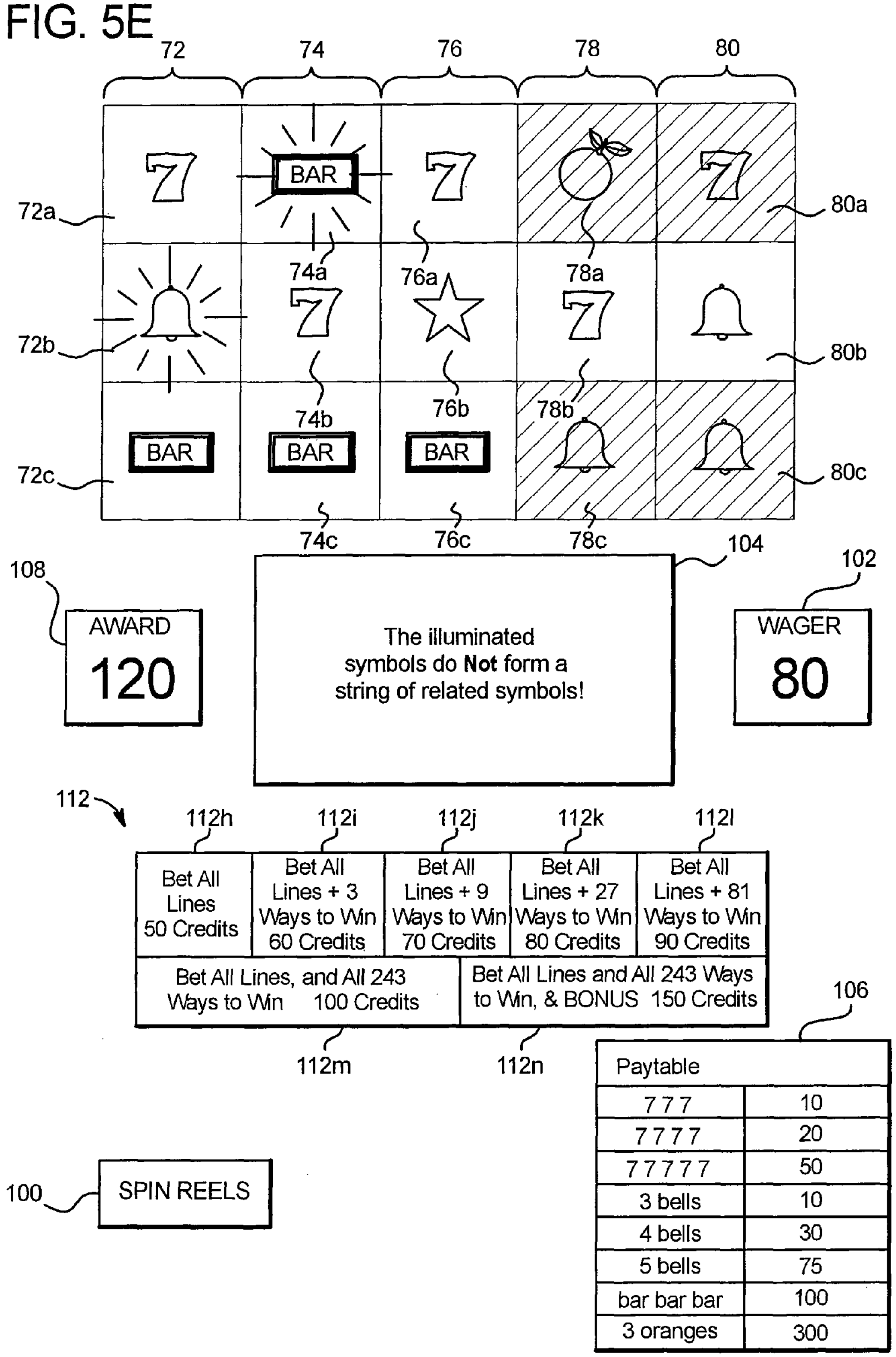

In FIG. 5E, active symbol positions 72*b* and 74*a* are illuminated to indicate that the gaming device evaluates the symbols displayed in these active symbol positions to determine whether they form a string of related symbols. The bar symbol generated in active symbol position 74*a* is not related to the bell symbol generated in active symbol position 72*b* (i.e., the bell symbol and bar symbol do not form all or part of a winning symbol combination according to paytable 106). Thus, the gaming device determines that the symbols do not form a string of related symbols. As indicated by the award meter 108, the player's award in the game is still 120.

Figure 5F:
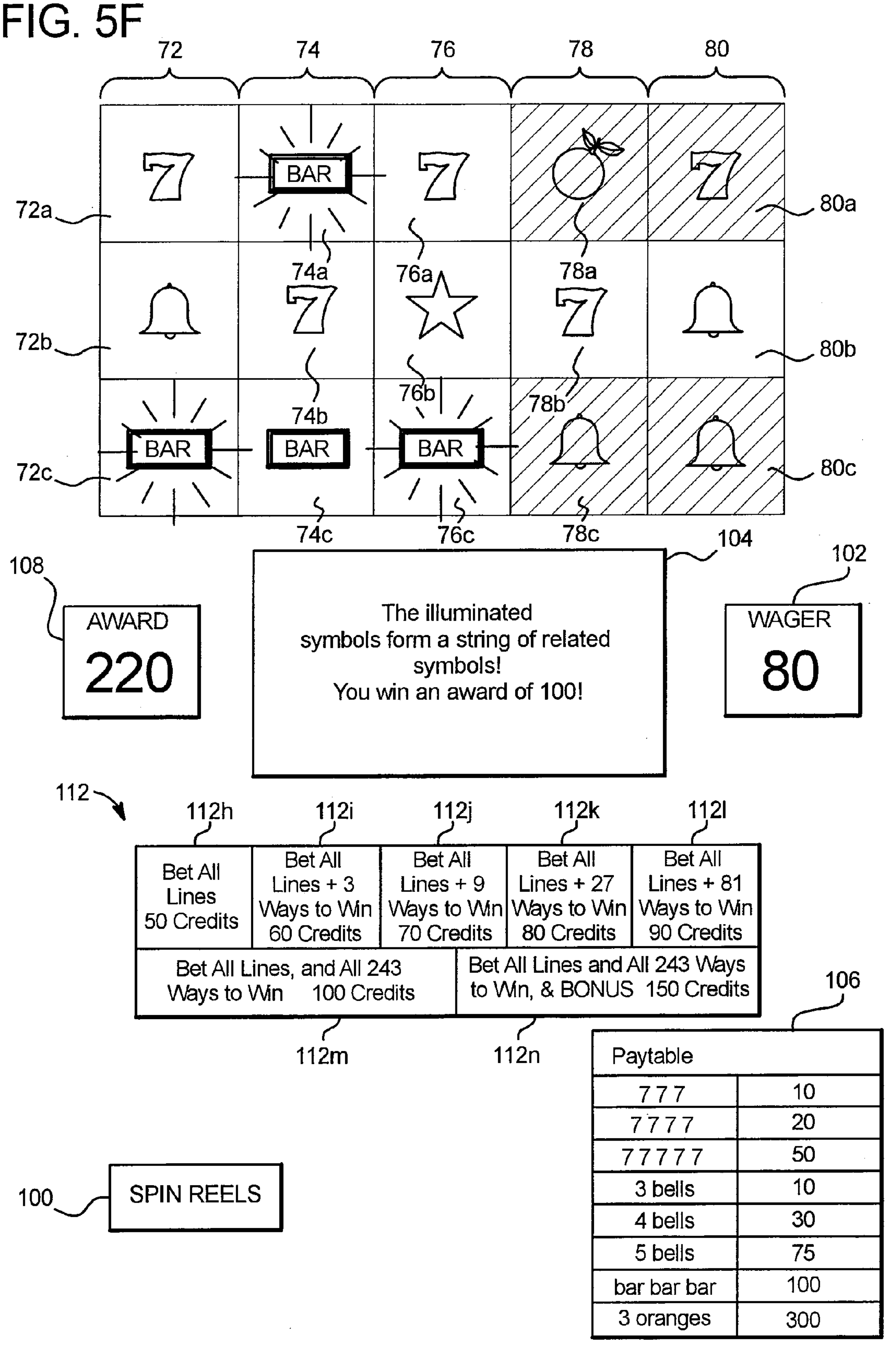

As illustrated in FIG. 5F, active symbol positions 72*c*, 74*a*, and 72*c* are illuminated to indicate that the gaming device is evaluating the symbols displayed in these active symbol positions to determine whether they form a string of related symbols. In this case, the gaming device determines that the bar symbol displayed in active symbol position 72*c* and the bar symbol displayed in active symbol position 74*a* are related because the two bar symbols form part of a winning symbol combination according to the paytable 106*b*. Thus, the gaming device classifies the bar symbols displayed in active symbol positions 72*c* and 74*a* as a string of related symbols.

After classifying the two bar symbols displayed in active symbol positions 72*c* and 74*a* as a string of related symbols, the gaming device determines whether any symbols on the next adjacent reel 76 need to be added to this string of related symbols.

The bar symbol displayed in active symbol position 76*c* is related to the bar symbols in the previously formed string of related symbols and can be added to the string of related symbols. After adding the bar symbol displayed in active symbol position 76*c* to the string of related symbols, the gaming device determines that there are no related symbols in the next adjacent reel 78 that can be added to the string of related symbols. The gaming device therefore marks the string of related symbols as complete. According to paytable 106, the completed string which includes three bar symbols corresponds to a winning symbol combination associated with an award of 100. The gaming device provides an award of 100 to the player and adds this award to the player's previous award of 120. Thus, the player has a total award of 220, as indicated in the award meter 108.

Figure 5G:
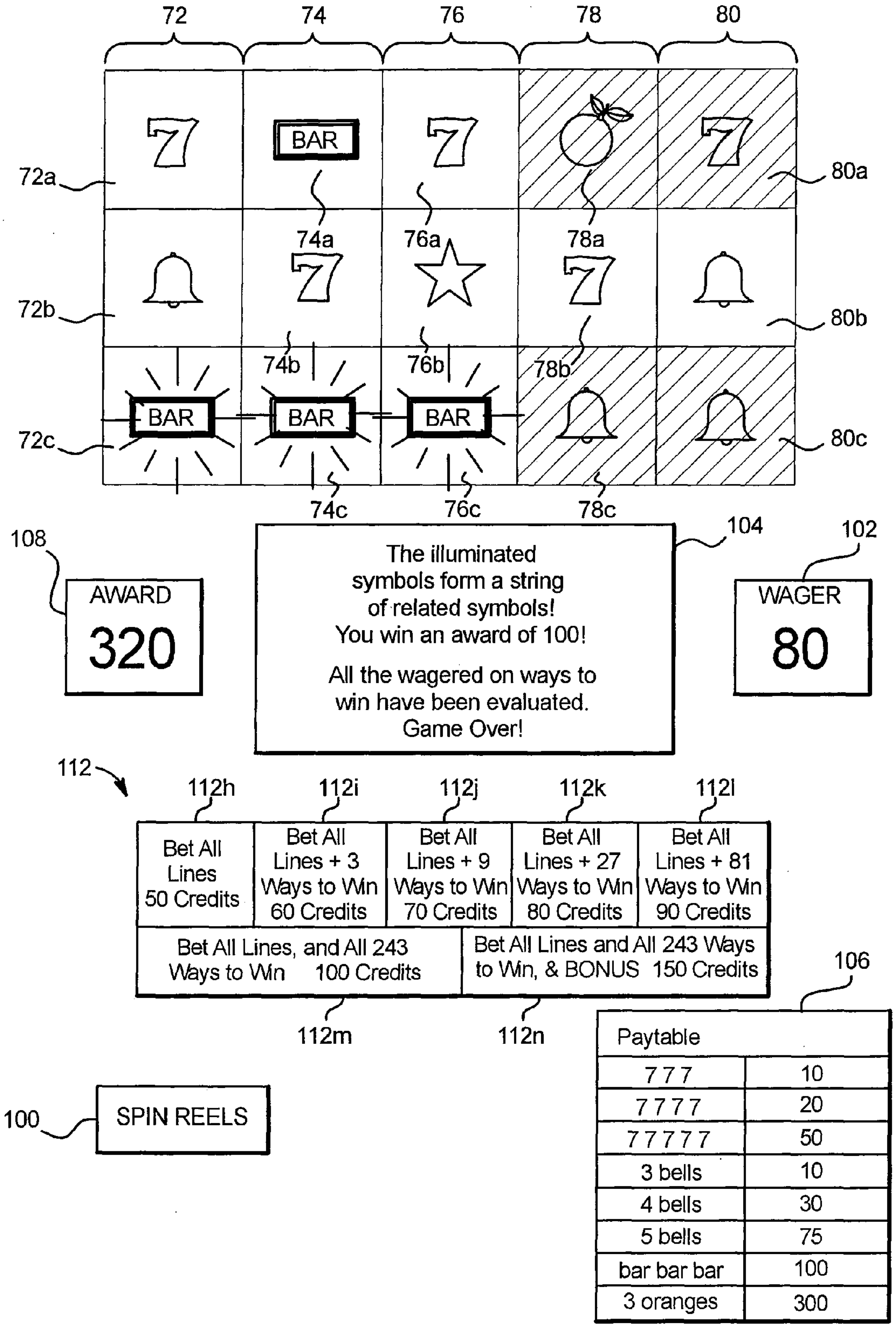

As illustrated in FIG. 5G, active symbol positions 72*c*, 74*c*, and 72*c* are illuminated to indicate that the gaming device is evaluating the symbols displayed in these active symbol positions to determine whether they form a string of related symbols. In this case, the gaming device determines that the bar symbol displayed in active symbol position 72*c* and the bar symbol displayed in active symbol position 74*c* are related because the two bar symbols form part of a winning symbol combination according to the paytable 106*b*. Thus, the gaming device classifies the bar symbols displayed in active symbol positions 72*c* and 74*c* as a string of related symbols.

After classifying two bar symbols displayed in active symbol positions 72*c* and 74*c* as a string of related symbols, the gaming device determines whether any symbols on the next adjacent reel 76 need to be added to this string of related symbols.

The bar symbol displayed in active symbol position 76*c* is related to the bar symbols in the previously formed string of related symbols. Accordingly, the gaming device determines that the bar symbol displayed active symbol position 76*c* can be added to the string of related symbols. After adding the bar symbol displayed in active symbol position 76*c* to the string of related symbols, the gaming device determines that there are no related symbols in the next adjacent reel 78 that can be added to the string of related symbols. The gaming device therefore marks the string of related symbols as complete. According to paytable 106, the completed string which includes three bar symbols corresponds to a winning symbol combination associated with an award of 100. The gaming device provides an award of 100 to the player and adds this award to the player's previous award of 220. Thus, the player has a total award of 320, as indicated in the award meter 108.

It should be appreciated that, in this example, the player wagered 80 credits, which is a wager amount in the second range of wager amounts. Because the player did not wager in the third range of wager amounts (i.e., by placing a wager of 150 credits), the player does not qualify for the bonus trigger evaluation. Thus, even if the bonus trigger is indicated on the reels, the player will not have the chance to participate in the bonus event.

As seen in FIG. 5G, the star symbol (i.e., the bonus trigger) is indicated on the reels in symbol position 76*b*. However, since the player's wager was not in the third range of wager amounts, the player is not eligible to participate in the bonus event.

In one embodiment, bonus events are tied to reel symbols. In such an embodiment, if the player qualifies for the bonus trigger evaluation and a bonus triggering symbol is generated on the reels, the player receives the bonus event associated with that particular bonus triggering symbol. In one such embodiment, different bonus triggering symbols are associated with different types of bonus events.

In one alternative embodiment, the third range of wager amounts includes a plurality of different wager amounts, rather than a single wager amount. In one such embodiment, each of the wager amounts in the third range of wager amounts is associated with one of a plurality of different bonus events. If the bonus trigger is indicated on the reels, the bonus event that is provided to the player is based on the wager amount in the third range of wager amounts that was placed by the player. The different bonus events may differ in that they: (i) are different types of bonus event; (ii) have different average expected payouts; (iii) have different types of awards; (iv) have different award values; and (v) any combination of these. In one embodiment, the same bonus trigger is used to trigger each of the plurality of different bonus events of the gaming device. In another embodiment, each different bonus event may have its own bonus trigger.

In another embodiment, each of the wager amounts in the third range of wager amounts corresponds to a different reel which is activated for the bonus trigger evaluation. In this embodiment, the gaming device enables the player to place a wager on one or more of the reels by placing a wager equal to one of the wager amounts in the third range of wager amounts. The player wins a bonus event if the bonus triggering symbol appears on one of the wagered on reels. In one embodiment, the player wins a bonus event for each bonus triggering symbol that appears on any of the wagered on reels. For example, if the player wagers a wager amount in the third range of wager amounts which activates all of the reels for the bonus evaluation, the gaming device will evaluate each of the reels to determine whether the bonus trigger is indicated on that reel. Therefore, the player has an increased chance of obtaining a bonus.

In one embodiment, if the player wins at least one award resulting from each of the different types of symbol evaluation provided in a play of the game and the bonus trigger is indicated in the bonus trigger evaluation, the gaming device provides an additional or super bonus event. For example, if the player wagers a wager amount corresponding to all of the paylines, all of the ways to win, and the bonus trigger evaluation, the player will receive a super bonus event if at least one of the paylines includes a winning symbol combination, at least one of the ways to win includes a string of related symbols that corresponds to a winning symbol combination, and the bonus trigger is indicated.

It should be appreciated that any suitable type of symbol evaluation may be associated with any wager amount or range of wager amounts. For example, in addition to the payline, ways to win, and bonus trigger evaluations described above, other types of symbol evaluations include, but are not limited to, a true scatter symbol evaluation, a cascading symbol evaluation, an evaluation to determine eligibility for a bonus event, an evaluation to determine eligibility for a progressive, and an evaluation to determine eligibility for a group event or a tournament.

In one example embodiment which includes a cascading symbol evaluation (not shown), the gaming device provides any awards to the player for any winning symbol combinations generated in the reel spin and eliminates the symbols in those winning symbol combinations. The gaming machine randomly generates and displays additional symbols in the vacated symbol positions and re-evaluates the new set of symbols to determine whether any winning symbol combinations are formed. This cascading effect continues with winning combinations being replaced and awards for winning combinations being provided until a winning combination is no longer formed.

In certain embodiments, the gaming device provides the cascading evaluation after the other symbol evaluations. That is, the cascading evaluation occurs last. For each symbol evaluation provided prior to the cascading evaluation, the gaming device is analyzing the same symbols (i.e., the symbols generated after spinning the reels). However, during the cascading evaluation, one or more of the generated symbols may change positions or be eliminated and replaced.

In one embodiment, wild symbols function in one or more evaluations. For example, if a player places a designated wager amount, the gaming device activates one or more wild symbols for the play of the game. After the gaming device generates a plurality of symbols in the play of the game, the gaming device evaluates the generated symbols, taking into account any activated wild symbols. Thus, the player has the opportunity win awards for symbol combinations that would otherwise not have been winning symbol combinations without the activated wild symbols. In one embodiment, the reels include one or more of these wild symbols. In one such embodiment, the wild symbols are inactive, unless the player wagers a wager amount corresponding to the wild symbol evaluation. In another embodiment, the wild symbols are secondary symbols or sub-symbols associated with the regular symbols on the reels. In such an embodiment, when the wild sub-symbols are activated for a play of the game, they cause the generated regular reel symbols with which they are associated to function as wild symbols for that play of the game.

In one alternative embodiment, the gaming device applies different types of symbol evaluations simultaneously to evaluate a set of symbols generated in a play of the game. In one such embodiment, the gaming device applies different types of symbol evaluations to different reels. In one example where the game includes five reels and each reel is associated with three symbol positions, if the player places a first wager amount to cause a play of the game, the gaming device evaluates each of the paylines associated with the five reels to determine whether any winning symbol combinations are indicated on the paylines. If the player places a second different wager amount to cause a play of the game, the gaming device provides the payline evaluation for each payline passing through a symbol position associated with each of first four reels and performs the different ways to win evaluation for the symbols on the fifth reel. For example, if any of the paylines associated with the first four reels include a winning symbol combination of four symbols, and one of the symbols on the fifth reel is related to the symbols of that winning symbol combination, the related symbol on the fifth reel may be added to the winning symbol combination. In certain embodiments, the second different amount is greater than or includes the first wager amount.

In this example, if the player places a third different wager amount to cause a play of the game, the gaming device provides the payline evaluation for each payline passing through a symbol position associated with each of first three reels and performs a different ways to win evaluation for the symbols on the fourth and fifth reels. For example, if any of the paylines associated with the first three reels include a winning symbol combination of three symbols, and one of the symbols on the fourth reel is related to the winning symbol combination, the related symbol on the fourth reel may be added to the winning symbol combination to form a new winning symbol combination of four symbols. If one of the symbols on the fifth reel is related to the new winning symbol combination, the related symbol on the fifth reel may be added to the new winning symbol combination. In certain embodiments, the third different amount is greater than or includes the first and second wager amounts. Increasing the amount wagered enables the player to get more than one type of symbol evaluation at a time to evaluate a set of generated symbols. Thus, the player may obtain winning symbol combinations associated with higher awards faster.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming system comprising:

at least one input device;

at least one display device;

at least one processor; and at least one memory device which stores a plurality of instructions, which when executed by the at least one processor, cause the at least one processor to operate with the at least one input device and the at least one display device to control a play of a game by:

(a) displaying a single reel set including a plurality of reels associated with said game, said reels including a plurality of symbols;

(b) enabling a player to input any one of:

(i) a first wager amount to cause the play of the game, (ii) a second wager amount to cause the play of the game, said second wager amount being greater than said first wager amount, and (iii) a third wager amount to cause the play of the game, said third wager amount being greater than said second wager amount;

(c) causing a random generation and display of a plurality of said symbols on the reels;

(d) if the player input the first wager amount, evaluating the generated symbols based on a first type of symbol evaluation;

(e) if the player input the second wager amount:

(i) evaluating the generated symbols based on the first type of symbol evaluation, and (ii) evaluating the same generated symbols based on a second different type of symbol evaluation;

(f) if the player input the third wager amount:

(i) evaluating the generated symbols based on the first type of symbol evaluation, (ii) evaluating the same generated symbols based on the second different type of symbol evaluation, and (iii) evaluating the same generated symbols based on a third different type of symbol evaluation;

(g) determining any awards resulting from any symbol evaluations provided in said play of the game; and (h) providing said determined awards to the player.

2. The gaming system of claim 1, wherein said first type of symbol evaluation includes evaluating the generated symbols to determine whether any winning symbol combinations are indicated along a designated number of paylines associated with the reels.

3. The gaming system of claim 2, wherein said designated number of paylines is selected from the group consisting of: a predetermined number of paylines, a randomly determined number of paylines, and a number of paylines based on the player's wager.

4. The gaming system of claim 2, wherein said designated number of paylines includes all of the paylines associated with the reels.

5. The gaming system of claim 1, wherein said second type of symbol evaluation includes:

(a) identifying a number of symbol positions associated with the reels as active symbol positions;

(b) identifying any symbols generated in any active symbol positions associated with a first one of the reels and any active symbol positions associated with a second one of the reels;

(c) determining if any of said identified symbols in active symbol positions associated with the first reel are related to any of said identified symbols in active symbol positions associated with the second reel, wherein each occurrence of related symbols forms a string of related symbols;

(d) for each string of related symbols:

(i) determining if any symbols displayed in active symbol positions associated with an adjacent reel are related to the symbols which form said string of related symbols, (ii) if one of said symbols in one of the active symbol positions associated with the adjacent reel is related to the symbols which form said string of related symbols, adding said related symbol to said string of related symbols, (iii) if any other of said symbols in one of the active symbol positions associated with the adjacent reel are related to the symbols which form said string of related symbols, forming an additional string of related symbols for each of the other related symbols, (iv) if none of said symbols in one of the active symbol positions associated with the adjacent reel are related to the symbols which form said string of related symbols, designating said string of related symbols as complete;

(e) repeating (d) until either each of the strings of related symbols is complete or there are no additional reels adjacent to the last reel which includes one of the related symbols; and (f) determining whether any formed strings of related symbols correspond to any winning combinations of symbols.

6. The gaming system of claim 5, wherein the number of symbol positions identified as active symbol positions is selected from the group of: a predetermined number of symbol positions, a randomly determined number of symbol positions, a number of symbol positions based on the player's wager.

7. The gaming system of claim 5, wherein the number of symbol positions identified as active symbol positions includes all of the symbol positions.

8. The gaming system of claim 1, wherein the third type of symbol evaluation includes evaluating the generated symbols to determine whether a bonus trigger is indicated.

9. The gaming system of claim 8, wherein if the bonus trigger is indicated, said at least one processor is programmed to provide a bonus event to the player.

10. The gaming system of claim 1, wherein the third type of symbol evaluation includes evaluating the symbols generated on the reels to determine whether any of said generated symbols form a winning combination of symbols.

11. A gaming system comprising:

at least one input device;

at least one display device;

at least one processor; and at least one memory device which stores a plurality of instructions, which when executed by the at least one processor, cause the at least one processor to operate with the at least one input device and the at least one display device to control a play of a game by:

(a) displaying a single reel set including a plurality of reels having a plurality of symbols, said reels associated with a plurality of paylines and a plurality of symbol positions;

(b) enabling a player to input any one of:

(i) a first wager amount to cause said play of the game, (ii) a second different wager amount to cause said play of the game, said second wager amount being greater than said first wager amount, and (iii) a third different wager amount to cause said play of the game, said third wager amount being greater than said second wager amount, (c) activating the reels to generate a plurality of the symbols on said reels;

(d) if the player input the first wager amount, providing a first type of symbol evaluation to determine whether any winning symbol combinations are indicated along any of said paylines;

(e) if the player input the second wager amount, providing the first type of symbol evaluation and additionally providing a second type of symbol evaluation to determine whether said same generated symbols form any strings of related symbols which correspond to one of said winning symbol combinations;

(f) if the player input the third wager amount, providing the first type of symbol evaluation, the second type of symbol evaluation, and additionally providing a third type of symbol evaluation to determine whether said same generated symbols include a bonus triggering event;

(g) determining outcomes for each of said provided symbol evaluations; and (h) providing to the player any awards associated with the determined outcomes for each of said provided symbol evaluations.

12. The gaming system of claim 11, wherein said first type of symbol evaluation includes evaluating the symbols indicated along a designated number of paylines to determine whether any winning symbol combinations are indicated along said paylines.

13. The gaming system of claim 12, wherein said designated number of paylines includes a number of paylines based on the player's wager.

14. The gaming system of claim 12, wherein said designated number of paylines includes all of the paylines associated with the reels.

15. The gaming system of claim 11, wherein said second type of symbol evaluation includes:

(a) identifying a number of said symbol positions as active symbol positions;

(b) identifying any symbols generated in any active symbol positions associated with a first one of the reels and any active symbol positions associated with a second one of the reels;

(c) determining if any of said identified symbols in active symbol positions associated with the first reel are related to any of said identified symbols in active symbol positions associated with the second reel, wherein each occurrence of related symbols forms one of said strings of related symbols;

(d) for each string of related symbols:

(i) determining if any symbols displayed in active symbol positions associated with an adjacent reel are related to the symbols which form said string of related symbols, (ii) if one of said symbols in one of the active symbol positions associated with the adjacent reel is related to the symbols which form said string of related symbols, adding said related symbol to said string of related symbols, (iii) if any other of said symbols in one of the active symbol positions associated with the adjacent reel are related to the symbols which form said string of related symbols, forming an additional string of related symbols for each of the other related symbols, (iv) if none of said symbols in one of the active symbol positions associated with the adjacent reel are related to the symbols which form said string of related symbols, designating said string of related symbols as complete;

(e) repeating (d) until either each of the strings of related symbols is complete or there are no additional reels adjacent to the last reel which includes one of the related symbols; and (f) determining whether any formed strings of related symbols correspond to any winning symbol combinations.

16. The gaming system of claim 15, wherein the number of symbol positions identified as active symbol positions is selected from the group consisting of: a predetermined number of symbol positions, a randomly determined number of symbol positions, and a number of symbol positions based on the player's wager.

17. The gaming system of claim 15, wherein the number of symbol positions identified as active symbol positions includes all of the symbol positions.

18. The gaming system of claim 11, wherein if the generated symbols include a bonus triggering event, said at least one processor is programmed to provide a bonus event to the player.

19. A gaming system comprising:

at least one input device;

at least one display device;

at least one processor; and at least one memory device which stores a plurality of instructions, which when executed by the at least one processor, cause the at least one processor to operate with the at least one input device and the at least one display device to control a play of a game by:

(a) displaying a single reel set including a plurality of reels associated with said game, said reels having a plurality of symbols;

(b) enabling a player to place any one of a plurality of different predefined wager amounts to cause said play of the game, a plurality of said predefined wager amounts having different average expected values and causing a number of different types of symbol evaluations;

(c) causing a random generation of a plurality of said symbols;

(d) evaluating the generated symbols based on each type of symbol evaluation associated with said wager amount placed by the player;

(e) determining any awards to provide to the player resulting from the symbol evaluations provided in said play of the game; and (f) providing said determined awards to the player.

20. The gaming system of claim 19, wherein each of said predefined wager amounts has a different average expected value.

21. The gaming system of claim 19, wherein each of said predefined wager amounts is associated with a different number of types of symbol evaluations.

22. The gaming system of claim 19, wherein the greater the predefined wager amount, the greater the number of types of symbol evaluations associated with that predefined wager amount.

23. The gaming system of claim 19, wherein the average expected value associated with each of said predefined wager amounts is based on the number of types of symbol evaluations associated with said predefined wager amount.

24. A gaming system comprising:

at least one input device;

at least one display device;

at least one processor; and at least one memory device which stores a plurality of instructions, which when executed by the at least one processor, cause the at least one processor to operate with the at least one input device and the at least one display device to control a play of a game by:

(a) enabling a player to input any one of:

(i) a first wager amount to cause the play of the game, (ii) a second wager amount to cause the play of the game, said second wager amount being greater than said first wager amount, and (iii) a third wager amount to cause the play of the game, said third wager amount being greater than said second wager amount;

(b) causing a random generation and display of a plurality of symbols at a single symbol position set including a plurality of symbol positions;

(c) if the player input the first wager amount, evaluating the generated symbols based on a first type of symbol evaluation;

(d) if the player input the second wager amount:

(i) evaluating the generated symbols based on the first type of symbol evaluation, and (ii) evaluating the same generated symbols based on a second different type of symbol evaluation;

(e) if the player input the third wager amount:

(i) evaluating the generated symbols based on the first type of symbol evaluation, (ii) evaluating the same generated symbols based on the second different type of symbol evaluation, and (iii) evaluating the same generated symbols based on a third different type of symbol evaluation;

(f) determining any awards resulting from any symbol evaluations provided in said play of the game; and (g) providing said determined awards to the player.

25. The gaming system of claim 24, wherein said first type of symbol evaluation includes evaluating the generated symbols to determine whether any winning symbol combinations are indicated along a number of active paylines.

26. The gaming system of claim 25, wherein said number of active paylines is selected from the group of: a predetermined number of paylines, a randomly determined number of paylines, and a number of paylines based on the player's wager.

27. The gaming system of claim 24, wherein said symbol positions are arranged in a plurality of columns.

28. The gaming system of claim 27, wherein said second type of symbol evaluation includes:

(a) identifying a number of said symbol positions as active symbol positions;

(b) identifying any symbols generated in any active symbol positions associated with a first one of the columns and any active symbol positions associated with a second one of the columns;

(c) determining if any of said identified symbols in active symbol positions associated with the first column are related to any of said identified symbols in active symbol positions associated with the second column, wherein each occurrence of related symbols forms a string of related symbols;

(d) for each string of related symbols:

(i) determining if any symbols displayed in active symbol positions associated with an adjacent column are related to the symbols which form said string of related symbols, (ii) if one of said symbols in one of the active symbol positions associated with the adjacent column is related to the symbols which form said string of related symbols, adding said related symbol to said string of related symbols, (iii) if any other of said symbols in one of the active symbol positions associated with the adjacent column are related to the symbols which form said string of related symbols, forming an additional string of related symbols for each of the other related symbols, (iv) if none of said symbols in one of the active symbol positions associated with the adjacent column are related to the symbols which form said string of related symbols, designating said string of related symbols as complete;

(e) repeating (d) until either each of the strings of related symbols is complete or there are no additional columns adjacent to the last column which includes one of the related symbols; and (f) determining whether any formed strings of related symbols correspond to any winning combinations of symbols.

29. The gaming system of claim 28, wherein the number of symbol positions identified as active symbol positions is selected from the group of: a predetermined number of symbol positions, a randomly determined number of symbol positions, a number of symbol positions based on the player's wager.

30. The gaming system of claim 28, wherein the number of symbol positions identified as active symbol positions includes all of the symbol positions.

31. The gaming system of claim 24, wherein the third type of symbol evaluation includes evaluating the generated symbols to determine whether a bonus trigger is indicated.

32. The gaming system of claim 31, wherein if the bonus trigger is indicated, said at least one processor is programmed to provide a bonus event to the player.

33. The gaming system of claim 24, wherein the third type of symbol evaluation includes evaluating the generated symbols to determine whether any of said generated symbols form a winning combination of symbols.

34. A method of operating a gaming system comprising:

(a) enabling a player to input any one of:

(i) a first wager amount to cause a play of a game, (ii) a second wager amount to cause the play of the game, said second wager amount being greater than said first wager amount, and (iii) a third wager amount to cause the play of the game, said third wager amount being greater than said second wager amount;

(b) causing at least one processor to execute a plurality of instructions to cause a random generation of a plurality of symbols at a single symbol position set including a plurality of symbol positions;

(c) causing at least one display device to display of the plurality of symbols;

(d) if the player input the first wager amount, causing the at least one processor to execute the plurality of instructions to evaluate the generated symbols based on a first type of symbol evaluation;

(e) if the player input the second wager amount:

(i) causing the at least one processor to execute the plurality of instructions to evaluate the generated symbols based on the first type of symbol evaluation, and (ii) causing the at least one processor to execute the plurality of instructions to evaluate the same generated symbols based on a second different type of symbol evaluation;

(f) if the player input the third wager amount:

(i) causing the at least one processor to execute the plurality of instructions to evaluate the generated symbols based on the first type of symbol evaluation, (ii) causing the at least one processor to execute the plurality of instructions to evaluate the same generated symbols based on the second different type of symbol evaluation, and (iii) causing the at least one processor to execute the plurality of instructions to evaluate the same generated symbols based on a third different type of symbol evaluation;

(g) causing the at least one processor to execute the plurality of instructions to determine any awards resulting from any symbol evaluations provided in said play of the game; and (h) providing said determined awards to the player.

35. The method of claim 34, wherein causing the at least one processor to execute the plurality of instructions to evaluate the generated symbols based on the first type of symbol includes causing the at least one processor to execute the plurality of instructions to evaluate the generated symbols to determine whether any winning symbol combinations are indicated along a number of active paylines.

36. The method of claim 35, which includes selecting the number of active paylines from the group of: a predetermined number of paylines, a randomly determined number of paylines, and a number of paylines based on the player's wager.

37. The method of claim 34, which includes causing the at least one display device to display said symbol positions arranged in a plurality of columns.

38. The method of claim 37, wherein causing the at least one processor to execute the plurality of instructions to evaluate the generated symbols based on the second different type of symbol evaluation includes:

(a) causing the at least one processor to execute the plurality of instructions to identify a number of said symbol positions as active symbol positions;

(b) causing the at least one processor to execute the plurality of instructions to identify any symbols generated in any active symbol positions associated with a first one of the columns and any active symbol positions associated with a second one of the columns;

(c) causing the at least one processor to execute the plurality of instructions to determine if any of said identified symbols in active symbol positions associated with the first column are related to any of said identified symbols in active symbol positions associated with the second column, wherein each occurrence of related symbols forms a string of related symbols;

(d) for each string of related symbols:

(i) causing the at least one processor to execute the plurality of instructions to determine if any symbols displayed in active symbol positions associated with an adjacent column are related to the symbols which form said string of related symbols, (ii) if one of said symbols in one of the active symbol positions associated with the adjacent column is related to the symbols which form said string of related symbols, causing the at least one processor to execute the plurality of instructions to add said related symbol to said string of related symbols, (iii) if any other of said symbols in one of the active symbol positions associated with the adjacent column are related to the symbols which form said string of related symbols, causing the at least one processor to execute the plurality of instructions to form an additional string of related symbols for each of the other related symbols, (iv) if none of said symbols in one of the active symbol positions associated with the adjacent column are related to the symbols which form said string of related symbols, causing the at least one processor to execute the plurality of instructions to designate said string of related symbols as complete;

(e) causing the at least one processor to execute the plurality of instructions to repeat (d) until either each of the strings of related symbols is complete or there are no additional columns adjacent to the last column which includes one of the related symbols; and (f) causing the at least one processor to execute the plurality of instructions to determine whether any formed strings of related symbols correspond to any winning combinations of symbols.

39. The method of claim 38, which includes selecting the number of symbol positions identified as active symbol positions from the group of: a predetermined number of symbol positions, a randomly determined number of symbol positions, a number of symbol positions based on the player's wager.

40. The method of claim 38, which includes causing the at least one processor to execute the plurality of instructions to identify all of the symbol positions as active symbol positions.

41. The method of claim 34, wherein causing the at least one processor to execute the plurality of instructions to evaluate said generated symbols based on the third different type of symbol evaluation includes causing the at least one processor to execute the plurality of instructions to evaluate the generated symbols to determine whether a bonus trigger is indicated.

42. The method of claim 41, which includes providing a bonus event to the player if the bonus trigger is indicated.

43. The method of claim 34, wherein causing the at least one processor to execute the plurality of instructions to evaluate the generated symbols based on the third different type of symbol evaluation includes causing the at least one processor to execute the plurality of instructions to evaluate the generated symbols to determine whether any of said generated symbols form a winning combination of symbols.

44. The method of claim 34, which is provided through a data network.

45. The method of claim 44, wherein the data network includes an internet.

* * * * *

UNITED STATES PATENT AND TRADEMARK OFFICE

CERTIFICATE OF CORRECTION

PATENT NO. : 8,430,739 B2
APPLICATION NO. : 11/936928
DATED : April 30, 2013
INVENTOR(S) : Paulina Rodgers It is certified that error appears in the above-identified patent and that said Letters Patent is hereby corrected as shown below:

IN THE CLAIMS

In Claim 4, Column 37, Line 10, delete “of the”.
In Claim 5, Column 37, Lines 40 to 41, between “,” and “(iv)” insert --and--.
In Claim 5, Column 37, Line 48, replace the first instance of “the” with --a--.
In Claim 6, Column 37, Line 55, between “group” and the first instance of “of” insert --consisting--.
In Claim 7, Column 37, Line 61, delete “of the”.
In Claim 12, Column 38, Line 51, between “of” and “paylines” insert --the--.
In Claim 13, Column 38, Line 55, between the first instance of “of” and the first instance of “paylines” insert --the--.
In Claim 14, Column 38, Line 58, delete “of the”.
In Claim 15, Column 39, Lines 22 to 23, between “,” and “(iv)” insert --and--.
In Claim 15, Column 39, Line 30, replace the first instance of “the” with --a--.
In Claim 16, Column 39, Lines 35 to 36, between the second instance of “of” and the first instance of “symbol” insert --the--.
In Claim 16, Column 39, Line 38, between the first instance of “of” and “symbol” insert --the--.
In Claim 16, Column 39, Lines 38 to 39, between the second instance of “of” and the first instance of “symbol” insert --the--.
In Claim 16, Column 39, Line 39, between “of” and the second instance of “symbol” insert --the--.
In Claim 17, Column 39, Lines 41 to 42, between the second instance of “of” and the first instance of “symbol” insert --the--.
In Claim 18, Column 39, Line 45, replace “a” with --the--.
In Claim 26, Column 40, Line 67, between “group” and the second instance of “of” insert --consisting--.
In Claim 28, Column 41, Lines 36 to 37, between “,” and “(iv)” insert --and--.
In Claim 28, Column 41, Line 44, replace the first instance of “the” with --a--.
In Claim 29, Column 41, Lines 49 to 50, between the second instance of “of” and the first instance of “symbol” insert --the--.
In Claim 29, Column 41, Line 51, between “group” and the first instance of “of” insert --consisting--.

Signed and Sealed this
First Day of April, 2014

Michelle K. Lee

Michelle K. Lee
*Deputy Director of the United States Patent and Trademark Office*

IN THE CLAIMS

In Claim 29, Column 41, Lines 51 to 52, between the second instance of "of" and "symbol" insert --the--.
In Claim 29, Column 41, Line 52, between "of" and "symbol" insert --the--.
In Claim 29, Column 41, Line 53, between "of" and "symbol" insert --the--.
In Claim 30, Column 41, Lines 55 to 56, between the second instance of "of" and the first instance of "symbol" insert --the--.
In Claim 34, Column 42, Line 14, delete "of".
In Claim 35, Column 42, Lines 49 to 50, between "symbol" and "includes" insert --evaluation--.
In Claim 36, Column 42, Line 55, between "group" and the second instance of "of" insert --consisting--.
In Claim 38, Column 43, Line 31, after "," insert --and--.
In Claim 38, Column 44, Line 1, replace "the" with --a--.
In Claim 39, Column 44, Line 8, between "of" and the first instance of "symbol" insert --the--.
In Claim 39, Column 44, Line 9, between "group" and the first instance of "of" insert --consisting--.
In Claim 39, Column 44, Line 9, between the second instance "of" and "symbol" insert --the--.
In Claim 39, Column 44, Line 10, between "of" and "symbol" insert --the--.
In Claim 39, Column 44, Line 11, between "of" and "symbol" insert --the--.